Nov. 3, 1936.　　　　W. W. LASKER　　　　2,059,253
COMBINED TYPEWRITER, ACCOUNTING MACHINE, AND PUNCH
Filed Aug. 30, 1933　　　23 Sheets-Sheet 1

INVENTOR
William W. Lasker

ATTORNEY

Nov. 3, 1936. W. W. LASKER 2,059,253
COMBINED TYPEWRITER, ACCOUNTING MACHINE, AND PUNCH
Filed Aug. 30, 1933 23 Sheets-Sheet 2

INVENTOR
William W. Lasker
by
Charles H. O'Brien

ATTORNEY

Nov. 3, 1936. W. W. LASKER 2,059,253
COMBINED TYPEWRITER, ACCOUNTING MACHINE, AND PUNCH
Filed Aug. 30, 1933 23 Sheets-Sheet 3

INVENTOR
William W. Lasker
by
ATTORNEY

Nov. 3, 1936.   W. W. LASKER   2,059,253
COMBINED TYPEWRITER, ACCOUNTING MACHINE, AND PUNCH
Filed Aug. 30, 1933   23 Sheets-Sheet 5

INVENTOR
William W. Lasker
by
ATTORNEY

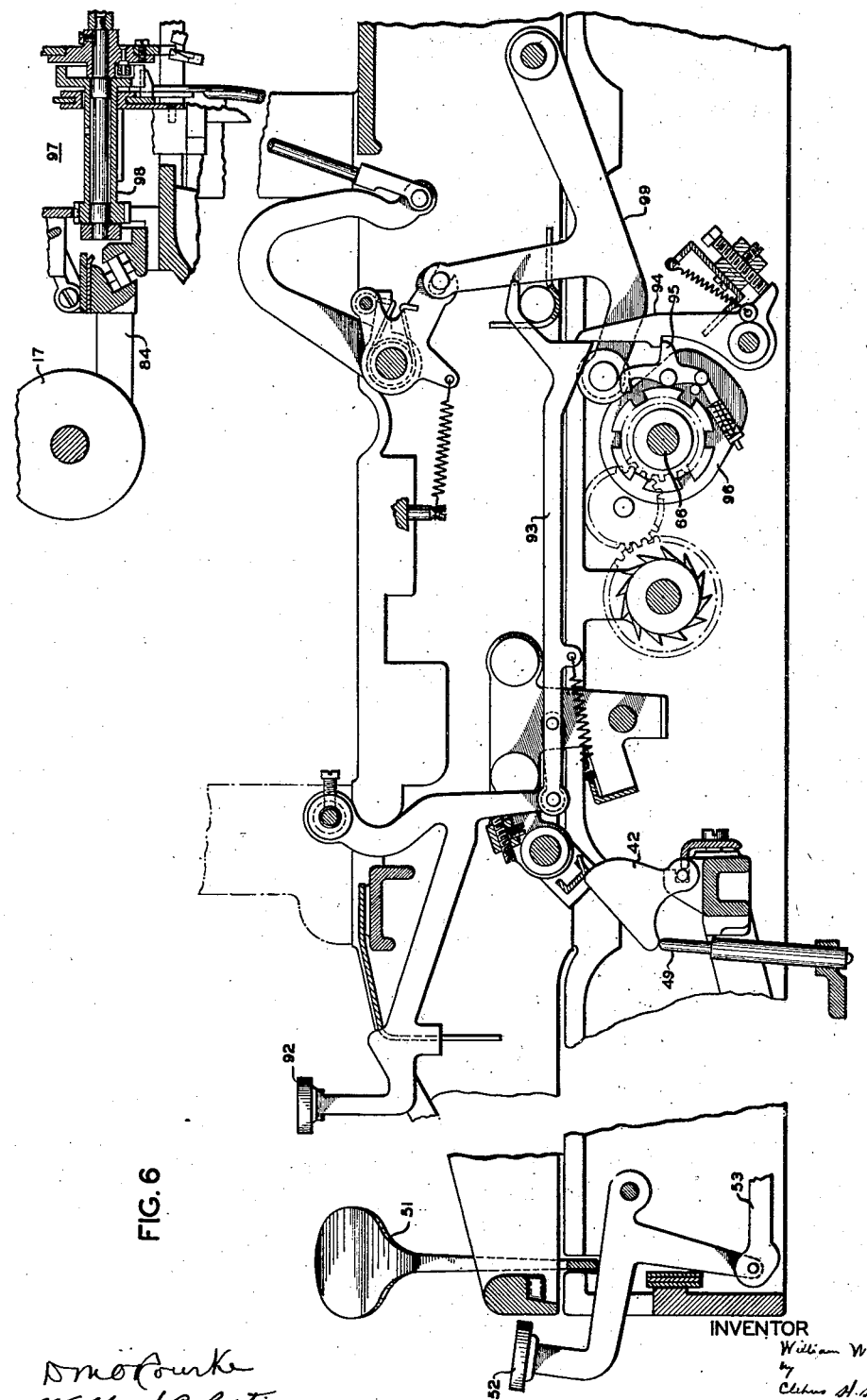

Nov. 3, 1936.  W. W. LASKER  2,059,253
COMBINED TYPEWRITER, ACCOUNTING MACHINE, AND PUNCH
Filed Aug. 30, 1933  23 Sheets-Sheet 7
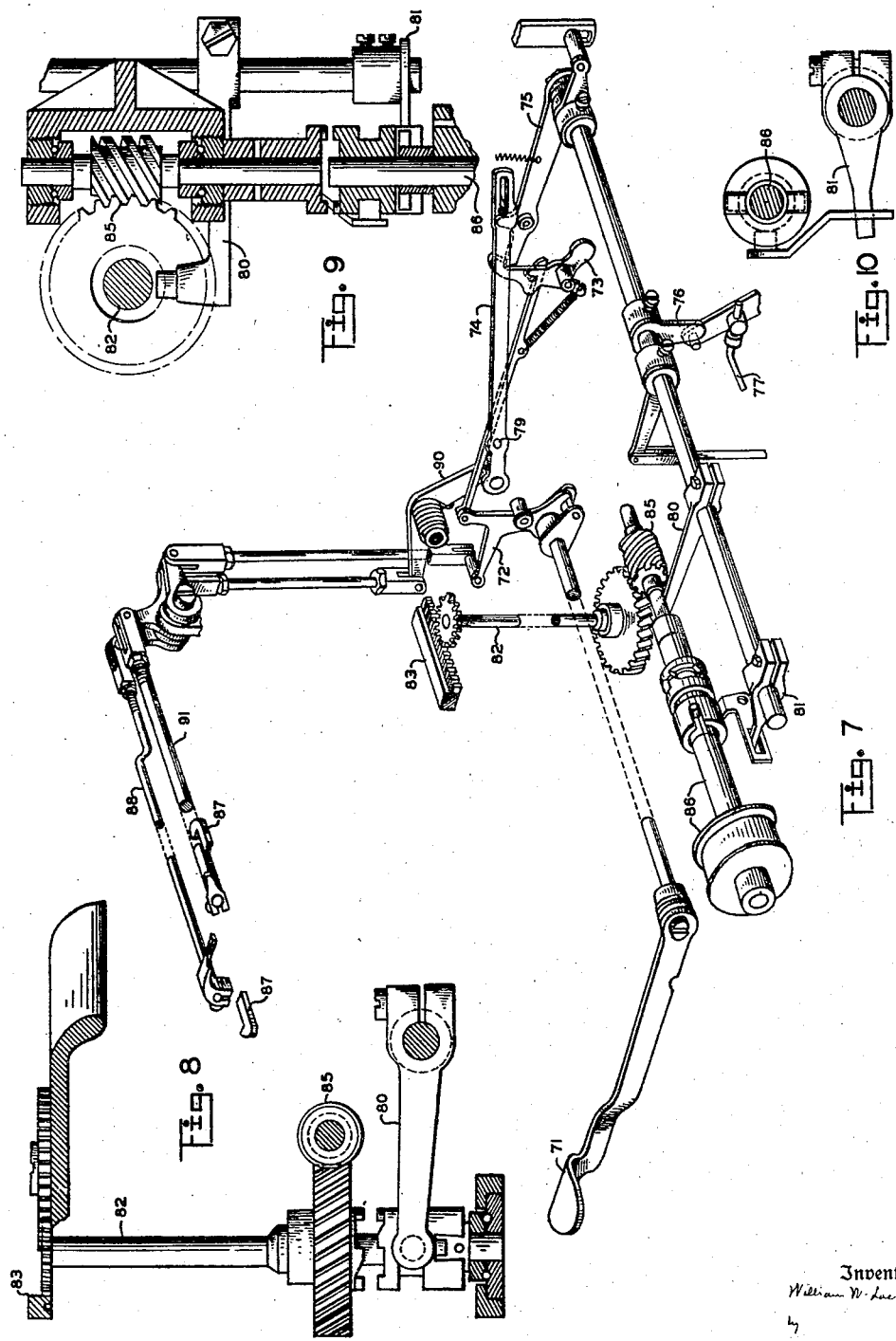
Inventor
William W. Lasker
by
Attorney Nov. 3, 1936.  W. W. LASKER  2,059,253
COMBINED TYPEWRITER, ACCOUNTING MACHINE, AND PUNCH
Filed Aug. 30, 1933   23 Sheets-Sheet 8
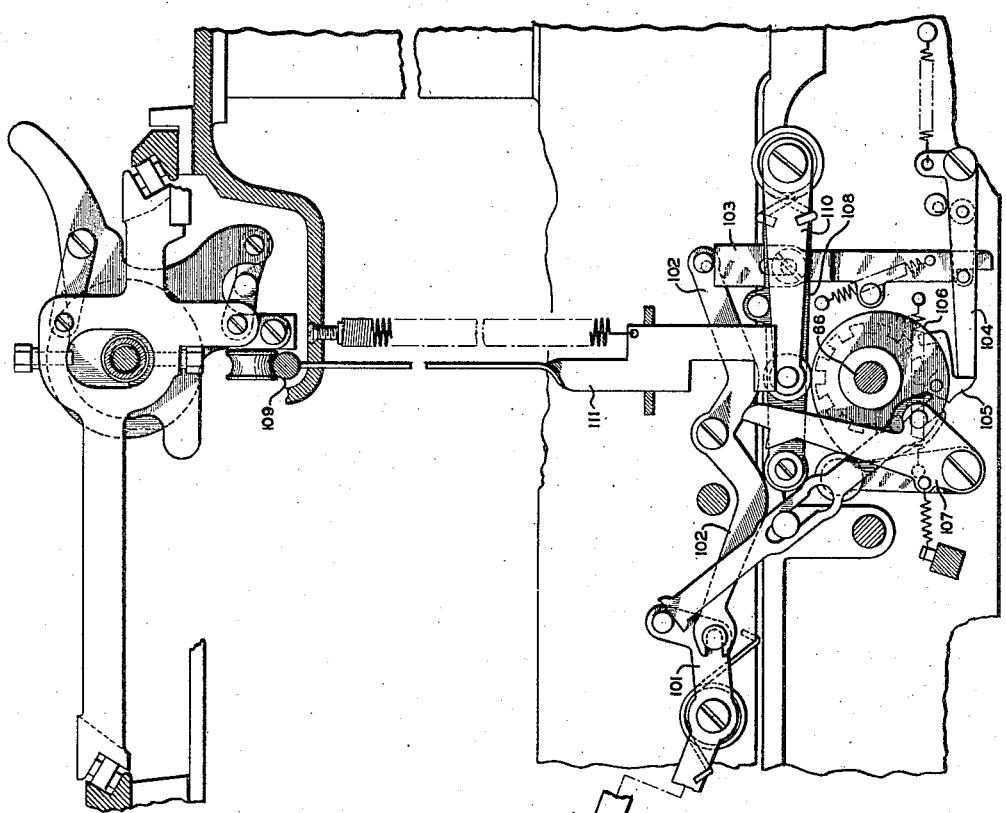
FIG. 11
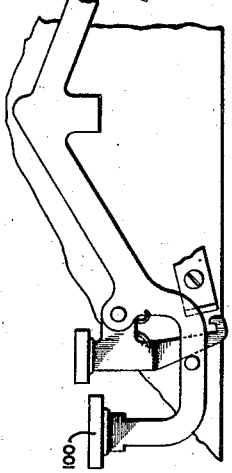
INVENTOR
ATTORNEY Nov. 3, 1936.　　　　W. W. LASKER　　　　2,059,253
COMBINED TYPEWRITER, ACCOUNTING MACHINE, AND PUNCH
Filed Aug. 30, 1933　　　23 Sheets-Sheet 9
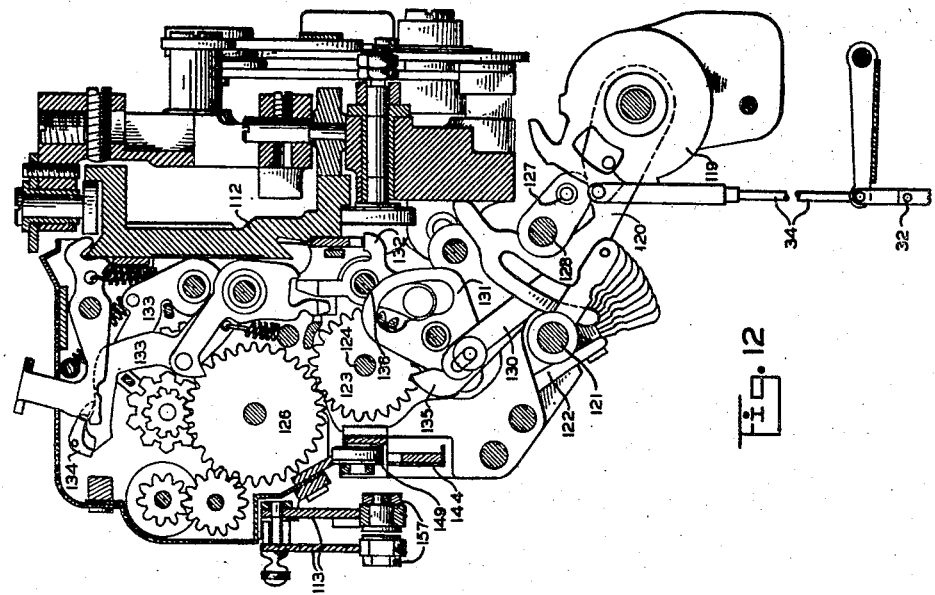
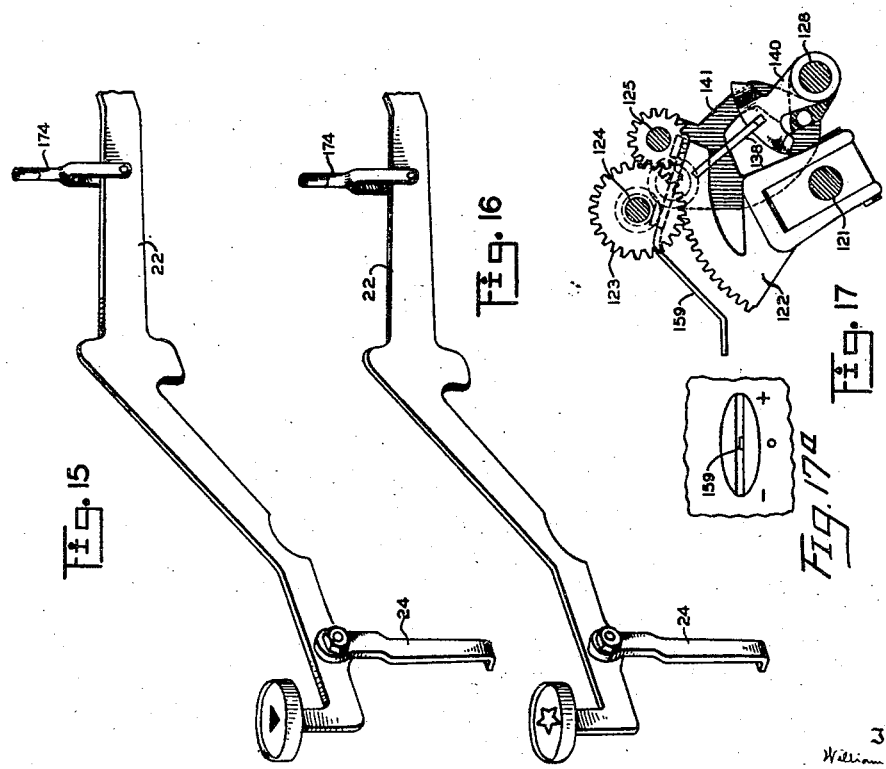
Inventor
William W. Lasker
by
Cletus H. Stillman
Attorney

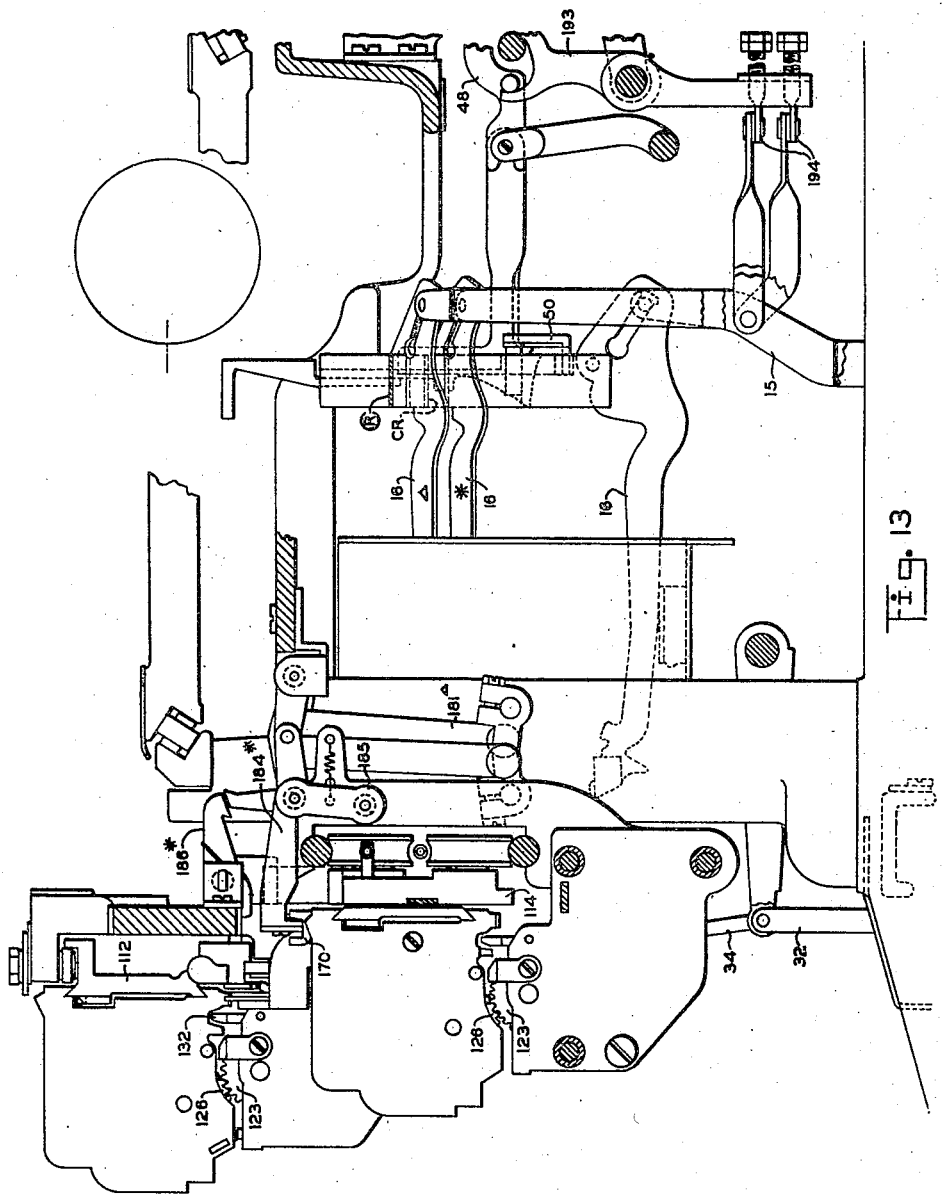

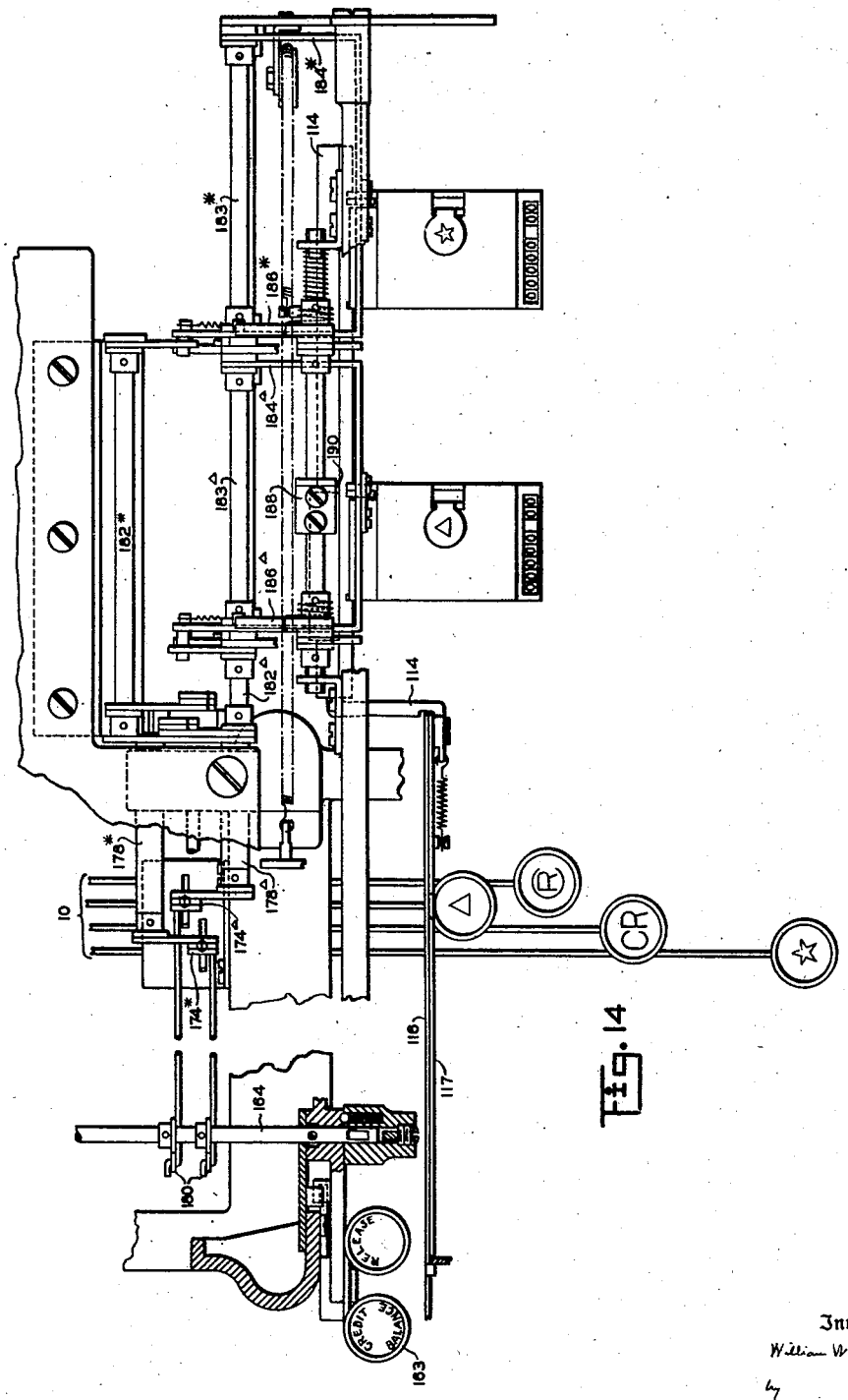

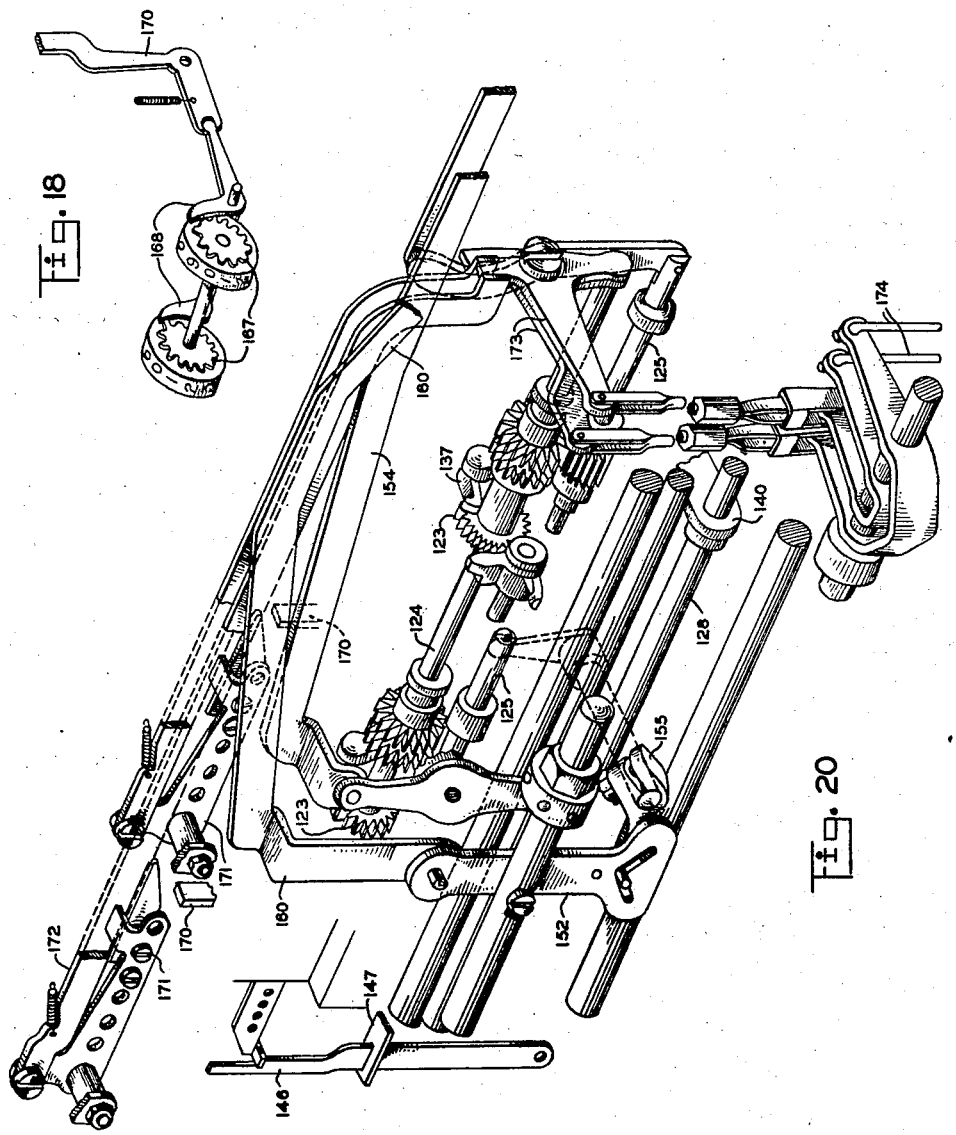

Nov. 3, 1936.  W. W. LASKER  2,059,253
COMBINED TYPEWRITER, ACCOUNTING MACHINE, AND PUNCH
Filed Aug. 30, 1933   23 Sheets-Sheet 13

Nov. 3, 1936.   W. W. LASKER   2,059,253
COMBINED TYPEWRITER, ACCOUNTING MACHINE, AND PUNCH
Filed Aug. 30, 1933   23 Sheets-Sheet 14
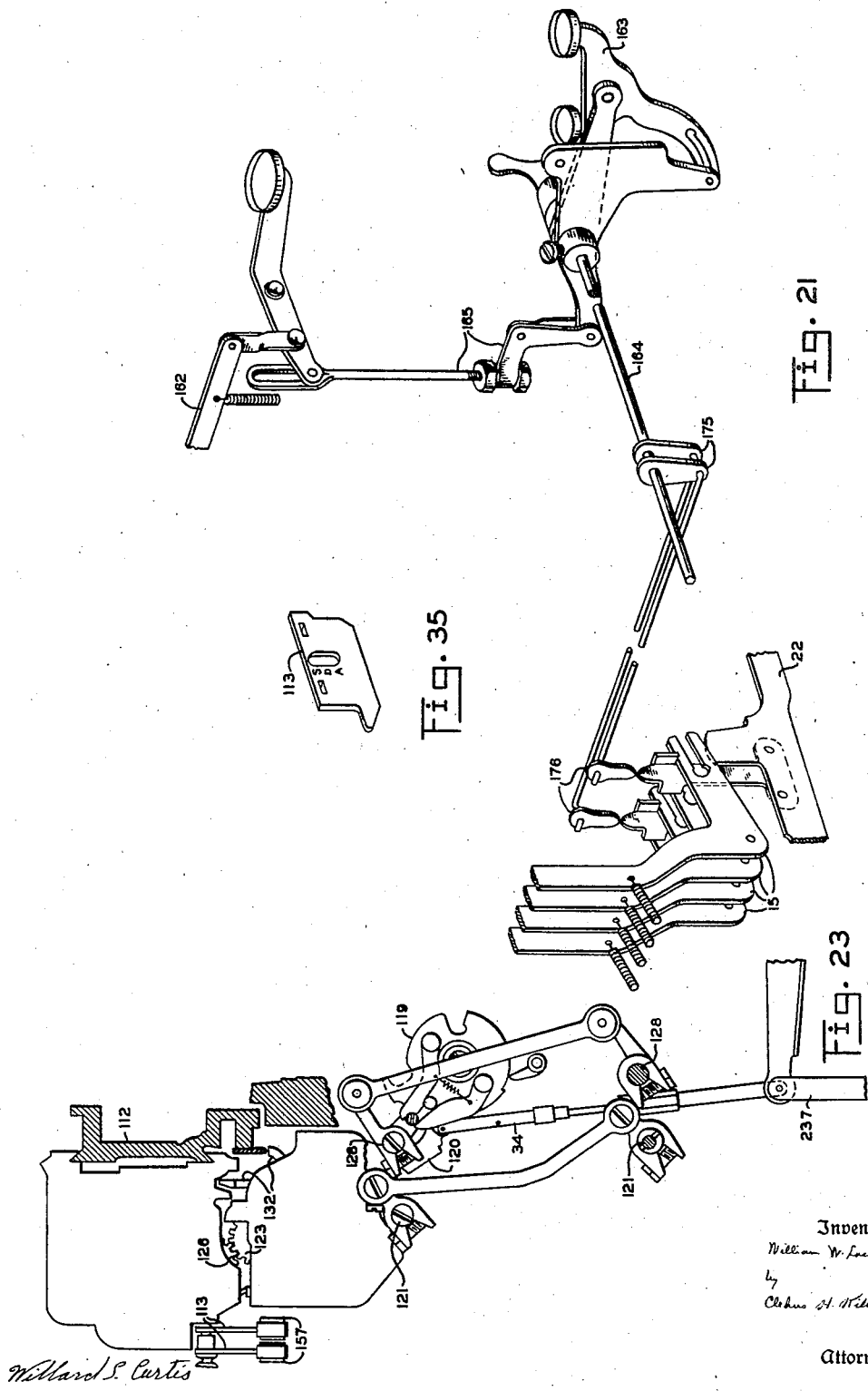

Nov. 3, 1936.   W. W. LASKER   2,059,253
COMBINED TYPEWRITER, ACCOUNTING MACHINE, AND PUNCH
Filed Aug. 30, 1933   23 Sheets-Sheet 15
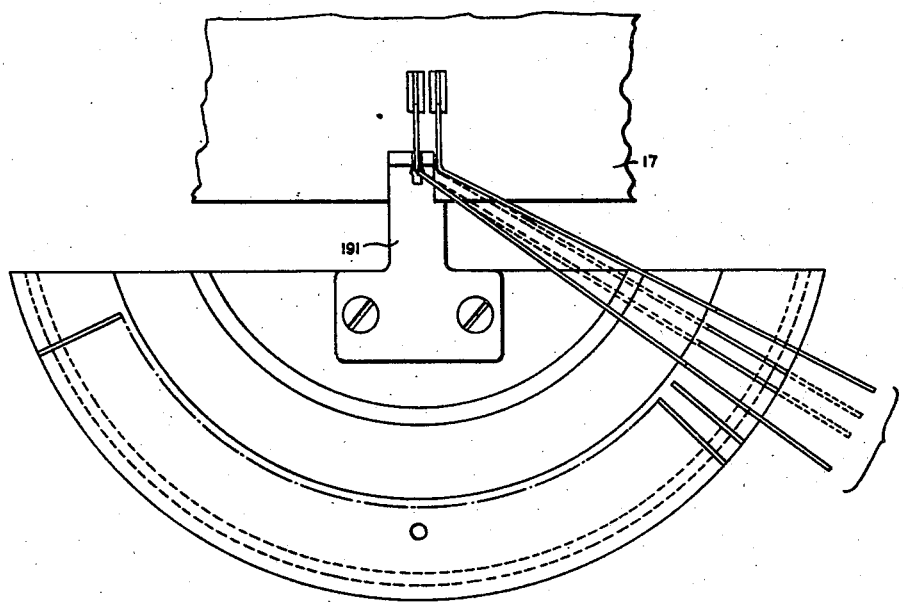
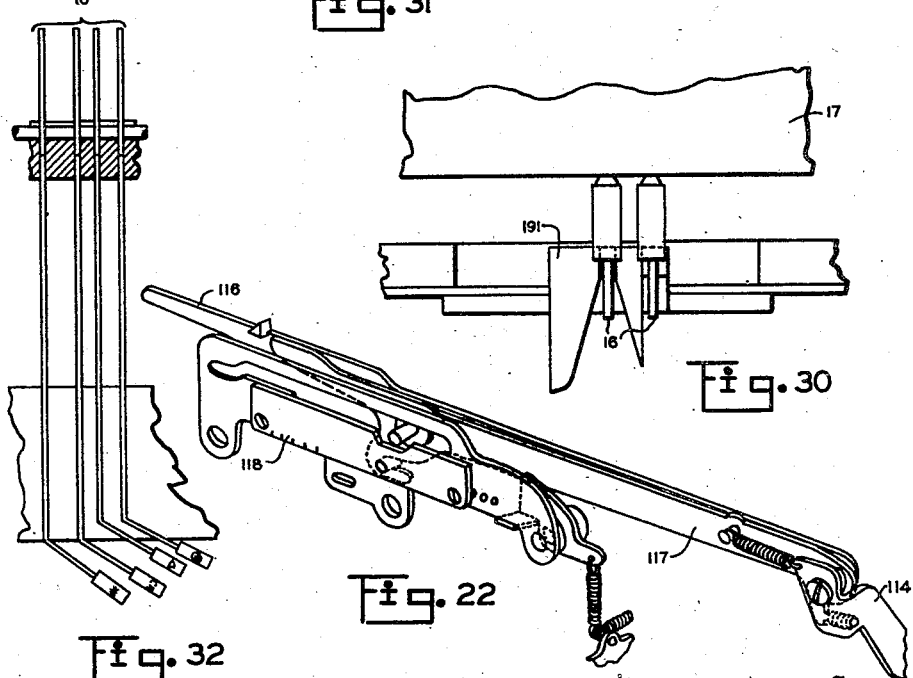

Nov. 3, 1936.                W. W. LASKER                2,059,253
            COMBINED TYPEWRITER, ACCOUNTING MACHINE, AND PUNCH
                    Filed Aug. 30, 1933        23 Sheets-Sheet 16

Inventor
William W. Lasker
by
Attorney

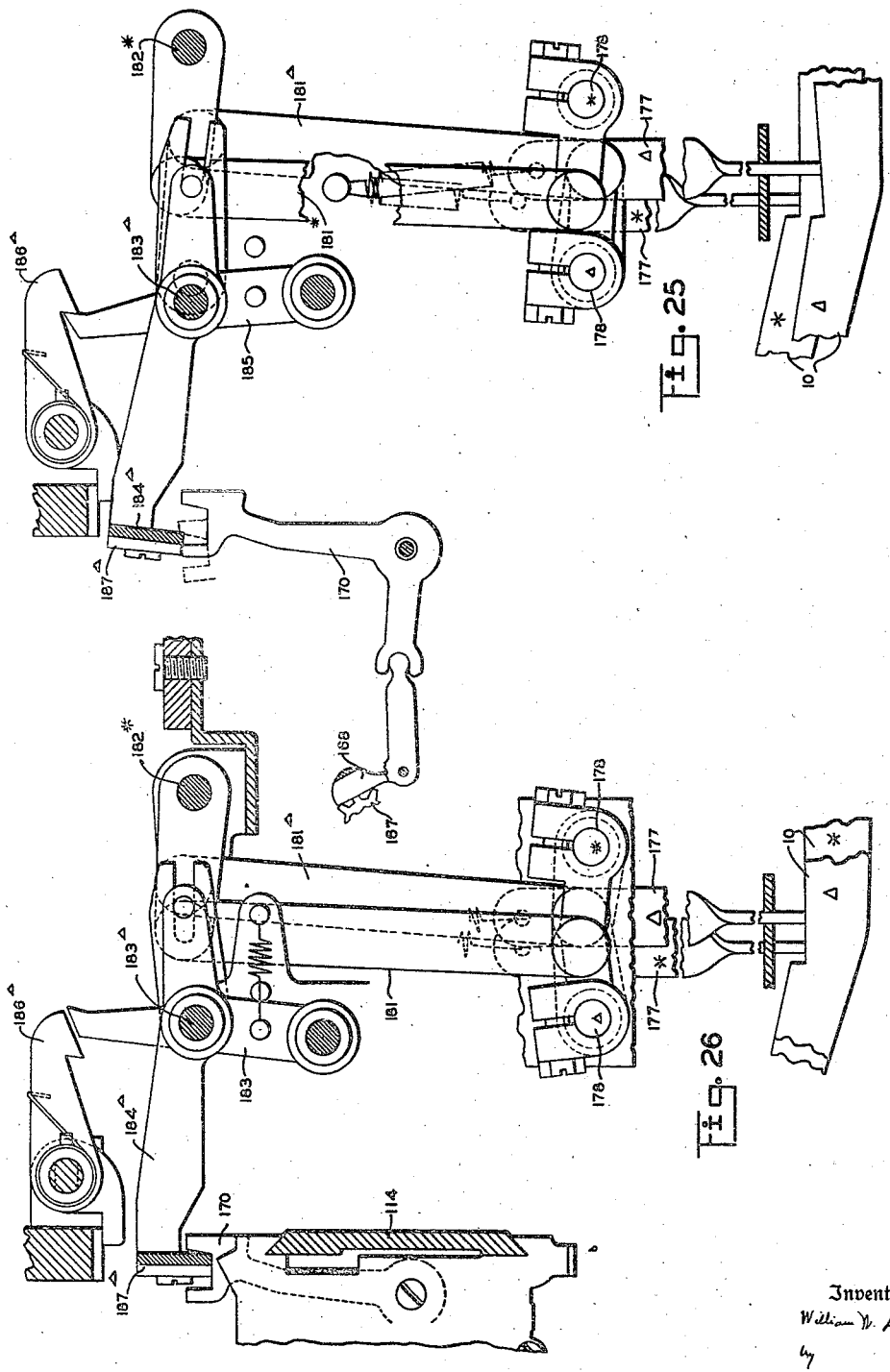

Nov. 3, 1936.   W. W. LASKER   2,059,253
COMBINED TYPEWRITER, ACCOUNTING MACHINE, AND PUNCH
Filed Aug. 30, 1933   23 Sheets-Sheet 18
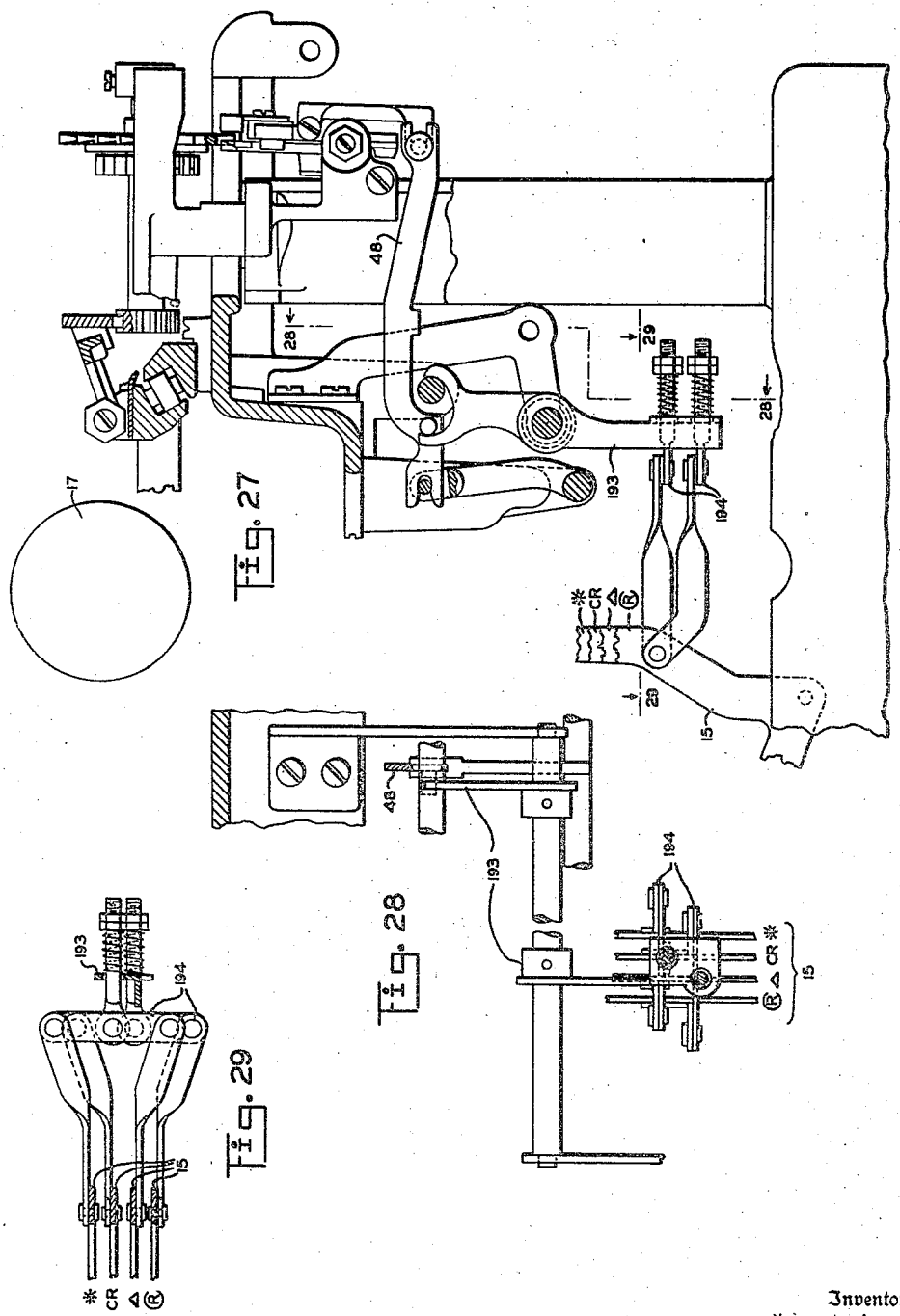

Nov. 3, 1936.  W. W. LASKER  2,059,253
COMBINED TYPEWRITER, ACCOUNTING MACHINE, AND PUNCH
Filed Aug. 30, 1933  23 Sheets-Sheet 19

Nov. 3, 1936.  W. W. LASKER  2,059,253
COMBINED TYPEWRITER, ACCOUNTING MACHINE, AND PUNCH
Filed Aug. 30, 1933  23 Sheets-Sheet 20

Nov. 3, 1936.  W. W. LASKER  2,059,253
COMBINED TYPEWRITER, ACCOUNTING MACHINE, AND PUNCH
Filed Aug. 30, 1933  23 Sheets-Sheet 21
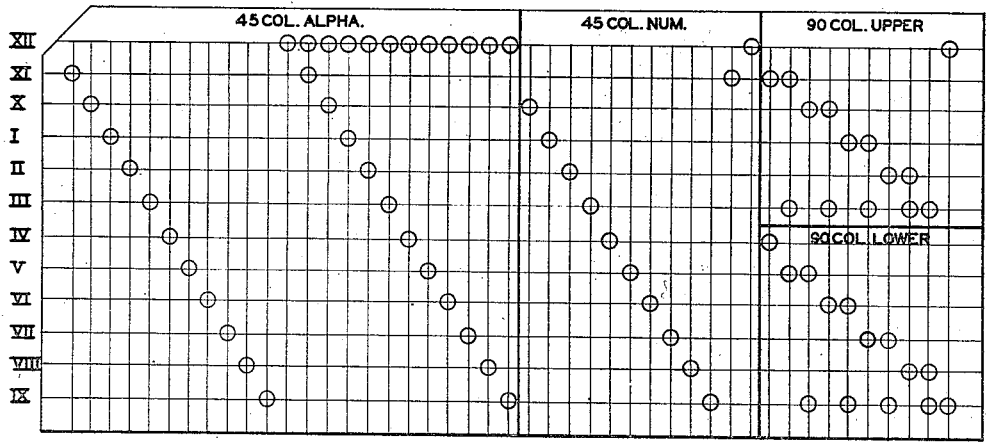
FIG. 39
FIG. 36
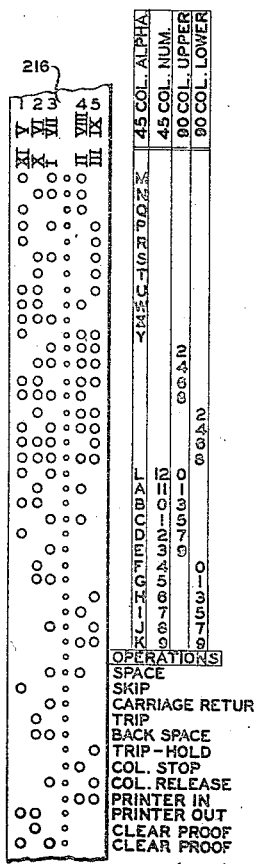
FIG. 38
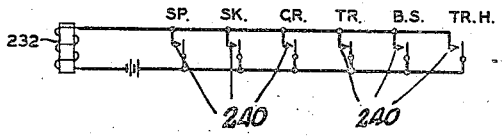
FIG. 37
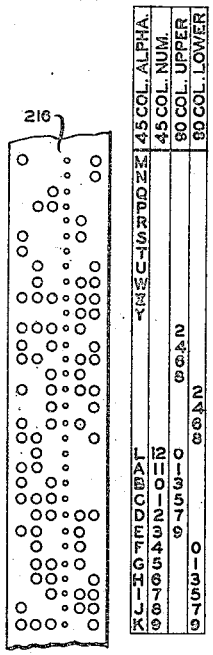
INVENTOR
William W. Lasker
by
Charles O. Killian
ATTORNEY

FIG. 40

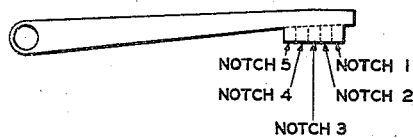

| NOTCHED AT | CHARACTER | PERFORATOR CODE | REMINGTON KEY |
|---|---|---|---|
| 5 4 3 | A | o  o o | 2 |
| 5 4  2 | B |  o O  o | 20 |
| 5 4 | C |  o o oo | 12 |
|       1 | D | o o o o o | 10 |
| 5  3 | E |  o o  o o | 9 |
| 5  3  1 | F |  o o   o | 14 |
| 5     1 | G |  o o o o | 18 |
|   4   1 | H | o  o o o | 22 |
|     2 1 | I |  o o o o | 29 |
|   3 2 | J |  o o o    o | 26 |
|   4 | K | o   o o o o | 30 |
| 5 4 3  1 | L |   o   o | 34 |
|   4 3 2 | M | o  o     o | 28 |
|   4 3 2 1 | N | o  o | 24 |
| 5 4   2 1 | O |   o  o | 33 |
| 5 4     1 | P |   o o o | 37 |
| 5 4   2 1 | Q |   o o | 1 |
| 5  3 2 1 | R | o  o | 13 |
| 5   3 2 | S |  o o    o | 6 |
| 5 4 3 2 | T |    o     o | 17 |
|   4 3   1 | U | o   o   o | 25 |
|   4 3   1 | V | o  o    o | 16 |
|     3   1 | W | o o o    o | 5 |
| BLANK | X | o  o o o o o | 8 |
|     3 2 1 | Y | o o o | 21 |
| BLANK | Z | o  o o o o | 4 |

FIG. 41

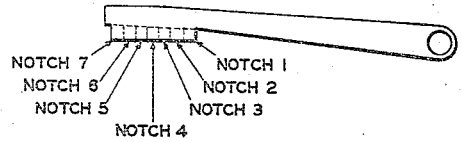

| NOTCHED AT | LOWER HALF | | FULL COLUMN | | UPPER HALF | | REMINGTON KEY |
|---|---|---|---|---|---|---|---|
| | NO. | CODE | NO. | CODE | NO. | CODE | |
| 7 6 5    1 | 1 | ooo | 1 | oooo | 1 | o oo | 3 |
| 7       2 | 2 | oooo o | 2 | oooooo | 2 | ooooo | 7 |
| 7 6   4   1 | 3 | o ooo | 3 | oo oo | 3 | oo o | 11 |
|   6   4  2 1 | 4 | o oo | 4 | oo o | 4 | o oo o | 15 |
| 7 6       2 1 | 5 | oooo | 5 | oooo | 5 | oooo | 19 |
|   5    2 | 6 | ooo o | 6 | o ooo | 6 | ooo oo | 23 |
|     3 2 | 7 | ooo o | 7 | oooo | 7 | ooooo | 27 |
| 7   4 3 | 8 | oo oo | 8 | ooo o | 8 | ooo | 31 |
| 7   5 | 9 | o oooc | 9 | o oooo | 9 | oo oo | 35 |
| 7 6 5   3   1 | 0 | oo o | 0 | oo o | 0 | o o | 39 |
| 7 6 5 4    1 | | | 11 | o oo | | | |
| 7 6 5 4  2 1 | | | 12 | o o | | | |

INVENTOR
William W. Lasker
by
Clarence A. William
ATTORNEY

Nov. 3, 1936.  W. W. LASKER  2,059,253
COMBINED TYPEWRITER, ACCOUNTING MACHINE, AND PUNCH
Filed Aug. 30, 1933  23 Sheets—Sheet 23
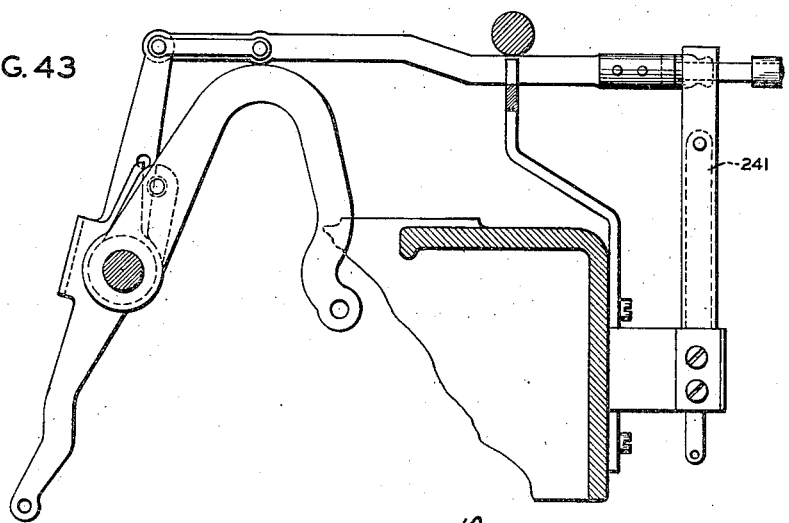
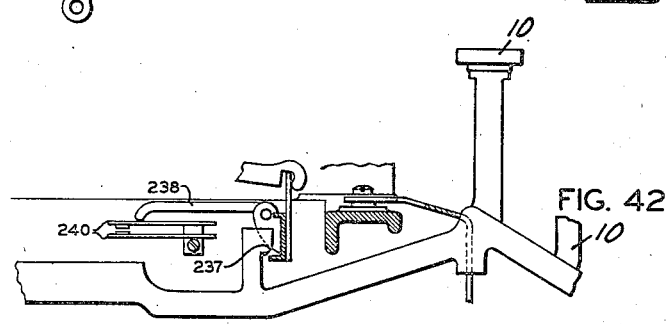
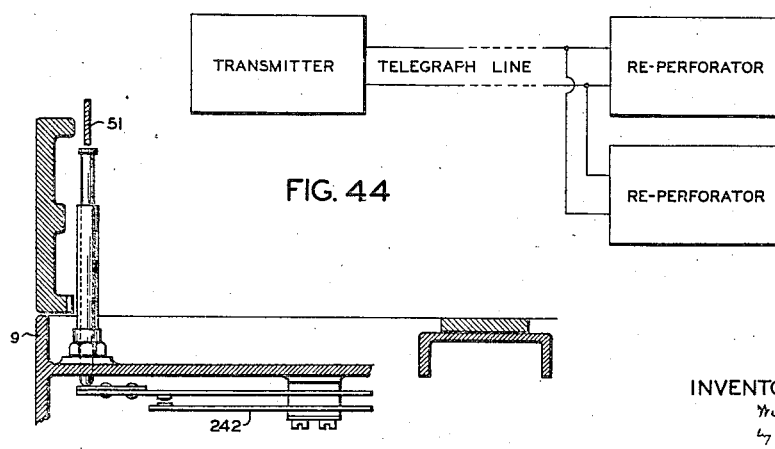
INVENTOR
ATTORNEY Patented Nov. 3, 1936

2,059,253

UNITED STATES PATENT OFFICE 2,059,253

COMBINED TYPEWRITER, ACCOUNTING MACHINE, AND PUNCH

William W. Lasker, Brooklyn, N. Y., assignor to Remington Rand Inc., Buffalo, N. Y., a corporation of Delaware Application August 30, 1933, Serial No. 687,404

8 Claims. (Cl. 164—112)

In many punched card accounting systems, it is desirable to provide a device to substantially simultaneously construct separate and distinct sets of cards from the data of the original entries, for example, one set of the cards may represent entries and data properly identifiable with customers, clients, etc., and a second set of cards may contain entries and data properly associated with the character of the transaction, the kind, quality, quantity, etc., of the goods bought or sold, as the case may be. A series of cards of each of these sets represents items and data which should be tabulated in different ledgers such as, for example, customers' or clients' account ledgers; cost accounting ledgers; inventory ledgers, etc. The cards of each set, after being sorted according to some desirable data designation, are run through a tabulator which automatically constructs the proper entries on the appropriate ledger sheets of the different ledgers.

Heretofore it has been necessary, when sets of cards have been desired, to have a weighty, bulky card punch or punches in the immediate proximity of the accounting machine, which is, of course, objectionable because of the floor space required, and the noise and vibration of the punch. It is, accordingly, desirable that the permanent punched record should be made by a simple, light machine, of small bulk and weight, and adapted to operate with a minimum of noise and vibration.

It is also frequently desirable to have certain items of data computed into balances prior to a run of the tape through the converting punch. Such computation must be performed as an incident to the setting of the elements which control the location of the tape perforations, which in turn control the perforations to be made in the cards by the perforating punch.

One object of the present invention is to automatically perforate a tape, similar to common telegraph tape, with a definite system of code holes, through the medium of automatic tape punching mechanism built into the base of the typewriter bookkeeping machine; thereby eliminating the necessity for card punches at the place where the accounting machines are operating.

Another object of this invention is to provide a mechanism for perforating a tape which may later be run through an interpreting machine and have the information perforated thereon transferred to as many card punching machines as may be desired.

Another object of this invention is to provide mechanism for performing balance computations, and for verifying the correctness of such computations during the process of perforating the tape.

Other objects of the invention are to provide practical mechanisms for modifying the tape perforating mechanism and the accounting machine to attain the general objects stated.

The invention disclosed herein is of very wide application to accounting systems requiring ledgers which can be constructed with the aid of perforated records, such systems including: factory accounting, brokerage accounting, department store accounting, etc. For example, in trust accounting, it is necessary to perforate a card which identifies a client, and the character, amount, time, etc. of each particular security transaction, and to simultaneously construct another card appropriate to the security, identifying the nature of the transaction, the client involved in the transaction, etc.

The simultaneous construction of a self-verified journal sheet containing the requisite information, requires a sheet having approximately twenty-seven separate entries. Some of these entries must be transmitted to one card, some to another, and others to neither. The familiar Remington accounting machine is peculiarly adaptable to self-verifying journal and ledger sheet construction. In general, this system provides a plurality of columnar totalizers, and one or more cross-footing totalizers inter-connected in such a way that the totals on the said totalizers are always related according to a predetermined balancing formula. The machine is frequently provided with mechanism which insures that amounts taken from the totalizers are correct; this mechanism takes the form of special indicia printing keys which are operable when, and only when, the totals on the totalizers are balanced according to a pre-arranged system.

Figs. 1 and 2 combine to form a sectional view of the mechanism of this disclosure.

Fig. 4a is an exploded isometric partial view of the tape feed and punching mechanism.

Fig. 6 is a view showing the skip palm tabulator and back space mechanism.

Fig. 7 is a diagrammatic isometric view of the automatic and manual typewriter carriage return mechanism.

Fig. 8 is a detail of Fig. 7.

Fig. 9 is another detail of Fig. 7.

Fig. 10 is a further detail of the clutch operating mechanism of Fig. 7.

Fig. 11 is a view of the case shift.

Fig. 12 is a section through a totalizer showing the differential mechanism and a portion of the universal controlling mechanism.

Fig. 13 is an elevation, with parts omitted, showing location of automatic clear sign mechanism and its relation to the totalizers.

Fig. 14 is a top plan view of the mechanism of Figs. 13 and 24.

Fig. 15 is an isometric view of a portion of the triangle key.

Fig. 16 is a corresponding view of the star key.

Fig. 17 is a detail of the master wheel gear train and its operating sector.

Fig. 17a is a front view of the computing member condition indicator.

Fig. 18 is a fragmentary isometric view of the automatic clearance proof mechanism for the cross totalizers.

Fig. 20 is a continuation of Fig. 19 illustrating the corresponding mechanism for the cross-footers and a portion of the proof of clearance mechanism.

Fig. 21 is a diagrammatic isometric view of the mechanism associated with the credit balance key.

Fig. 22 is a diagrammatic isometric view of the cross-footer pick-up-beam.

Fig. 23 is a detail view of the connections between the sector shafts and the universal shafts.

Fig. 25 is a view of the automatic clear sign mechanism showing the initiation of the printing of a clear sign.

Fig. 26 is a view of the automatic clear sign mechanism just after printing the second clear sign.

Fig. 27 is an elevation of the escapement control mechanism associated with the automatic clear sign mechanism for automatically printing a double clear sign and for initiating a carriage return movement.

Fig. 28 is a sectional view of Fig. 27 along the line 28—28.

Fig. 29 is a sectional view of Fig. 27 along the line 29—29.

Fig. 30 is a detail of two clear-sign type impinging upon the platen.

Fig. 31 is a detail view of the clear sign type bars and their location on the segment.

Fig. 32 is a detail view of the dual sets of clear sign types.

Fig. 35 is a detail view of a state control cam for the columnar totalizers.

Fig. 36 shows a piece of tape which has been punched, and the interpretation of said punching.

Fig. 37 shows a piece of tape similar to Fig. 36 but with a different code and its interpretation.

Fig. 38 shows the circuit operatable by the control bar.

Fig. 39 illustrates a Powers card with both alphabet and numerals punched therein.

Fig. 40 is a chart showing a character key blank and the code interpretation for the various notchings.

Fig. 41 is a chart similar to Fig. 40 for the numeral keys.

Fig. 42 is a diagrammatic showing of a special key and the double space contacts.

Fig. 43 is a view of a special switch to perform any desired operation on the upstroke of the backspace key.

Fig. 44 is a diagrammatic representation of a tape controlled telegraph line with reperforators.

Fig. 45 is a showing of the double space contacts controlled by the palm tabulator.

*Typewriter framework*

Figure 1:
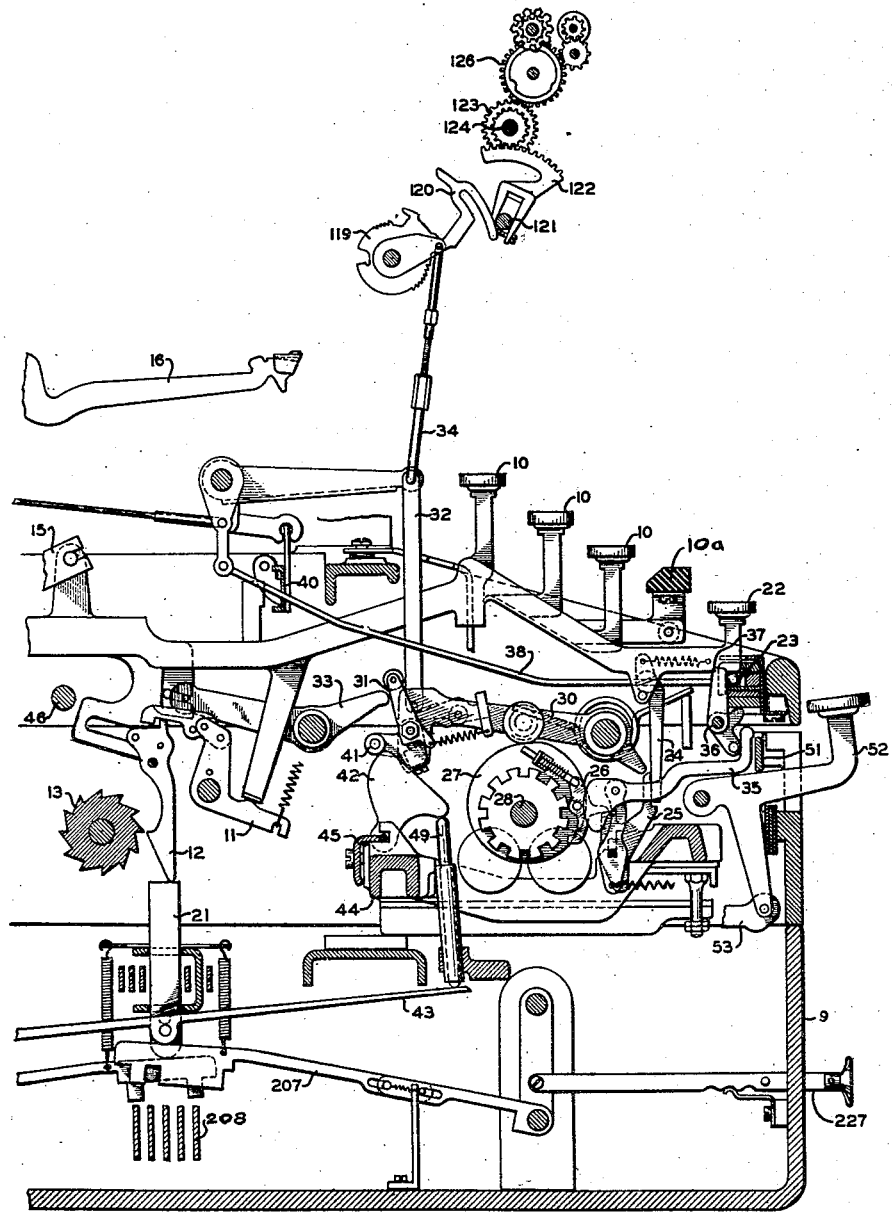

The frame of the combined electric typewriter and accounting machine is substantially that of the electric accounting machine. This frame carries a plurality of rods, pivots, projections, etc., which are not shown in detail in the accompanying drawings. Ordinarily, the specification omits specific reference to such constructions, except where clarity demands specific mention of a particular mounting. Care has been exercised in specifying all floating elements and all elements connected by a rigid shaft, by bails, etc. Usually such members are given a single reference character so as to facilitate reading of the drawings. It is to be understood that all elements whose support is not specifically mentioned, are carried in an obvious fashion by the main frame work, unless the context indicates the contrary.

*Alphabet keys (Figs. 1, 2, 3, 4, and 4a)*

The typewriting machine which controls the tape punching mechanism in the sub-base 9 is the well known electrified Remington accounting machine which has been described in detail in a number of patents and applications such as: Hart, S. N. 510,941, filed Jan. 24, 1931, Combined typewriting and computing machines; Wahl, Pat. No. 1,270,471, granted June 25, 1918, Calculating machine; Wahl, 1,349,024, granted Aug. 10, 1920, Calculating machine. In view of the above references, only a résumé description of the well known mechanism will be given here.

The key action is merely initiated by the operator and is then automatically completed due to connection to a power shaft. Such action is well described by the phrase "key-responsive". Each alphabet key 10 is pivoted in the usual manner near the rear of the machine and is held upwardly by a suitably located spring. Depending from each of the alphabet keys is a projection with a turned over end for rocking a spring pressed bell crank 11 which supports a wipe-pawl at its upper end. A slight depression of said bell crank against its spring and the wipe-pawl pivoted thereon rocks the lower end of the snatch pawl 12 into position to be engaged by a tooth of the power driven rotating snatch roll 13. Hence, initiation of a key depression causes a power response to complete the motion. The pawl 12 is pivoted on a downwardly extending projection integral with the arm of a horizontal actuating lever 14 lying parallel with the alphabet key lever, so that the snatch roll 13 will carry the lever downwardly and rock the bell crank 15, to actuate the type bar 16 to cause a printing impression on the paper surrounding the platen 17. At about the time the type bar reaches printing position, the snatch roll 13 has carried the pawl 12 downwardly and slightly rearwardly into the path of an adjustable pawl disengaging stud, thus automatically disconnecting said pawl from the snatch roll and permitting the spring of the actuating lever to return it to normal. Each pawl 12 has a limited amount of motion under the action of its spring (not shown) so that when it returns to normal, the extreme upper end of the pawl will be in position to again be actuated by the wipe-pawl of bell crank 11 when the alphabet key is again depressed.

If a key is held depressed, the upper end of pawl 12 contacts with the extreme rear lower surface of the wipe-pawl on bell crank 11 and, hence, the hook of 12 can be re-engaged with the snatch roll 13 only after the key has returned to normal. All the type bar actuating levers overlie a universal bar 18 which controls a ribbon vibrator 20, as is well known in the art.

Each pawl 12 is extended downwardly so that when it is drawn into engagement with the snatch roll, its extreme lower end will strike a corresponding interponent member 21 and force said member 21 downwardly to actuate the tape punching mechanism (Figs. 1, 2, 3, 4, and 4a) which will be described in detail later in this specification.

*Numeral keys*

Figure 2:
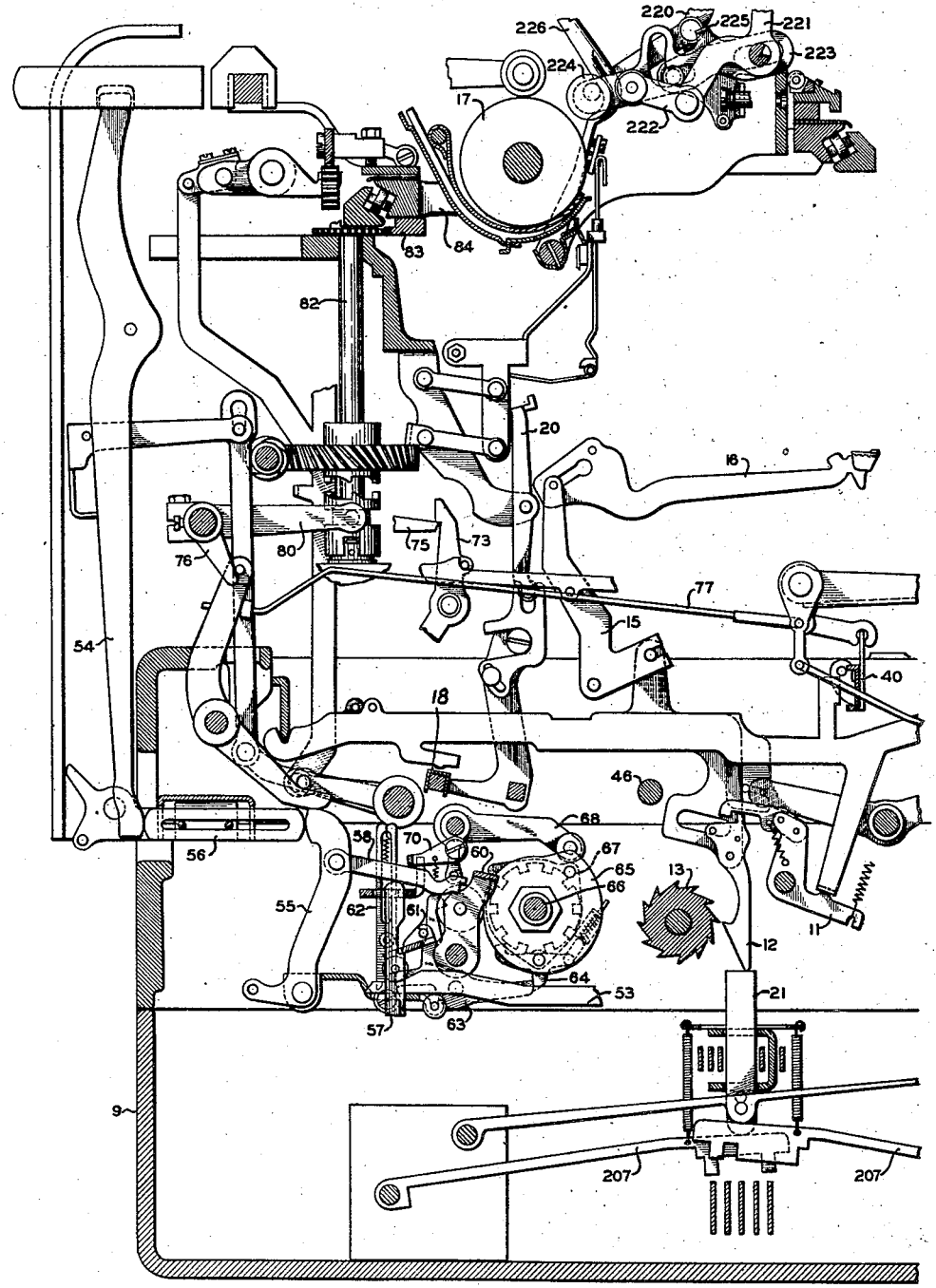

The operation of the numeral keys is slightly different from that of the alphabet keys. Referring to Figs. 1 and 2 it will be seen that when the operator touches a numeral key 22, the arm thereof enters the ball lock 23 to lock all other numeral keys against operation. Loosely pivoted on each numeral key is a spring urged pawl 24 whose lower turned over edge lies slightly above a shoulder on a tripping bell crank 25. The bell crank 25 is rocked against the tension of its spring as soon as the key enters the ball lock, and releases a spring pressed pawl 26 pivoted upon a cam disc 27 to connect the latter to the power driven rotating shaft 28 through a clutch element rigid with said shaft.

Riding on the periphery of each cam 27 is a roller, mounted on an arm 30, which is pressed downwardly by a powerful spring thus causing the roller to follow the contour of the rotating cam 27. Each cam 27 is provided with a slight depression in which the roller of arm 30 lies when said cam is disconnected from its clutch element. This consruction avoids erratic clutching and restoring action of cams 27. The rearward end of arm 30 carries an adjustable spring pressed wipe-pawl 31 and a link 32 also connected to the arm 30 by a pin-in-slot and spring pressed lever connection (including the spring of the wipe pawl). When the strong spring has forced the arm 30 downwardly as far as the rotating cam will permit, the wipe-pawl 31 snaps under the forward end of a rocker 33 which is connected by a pin-in-slot at its rearward end to a mutilated number key printing arm for actuating a bell crank 15 and a numeral type bar 16 for printing on the paper surrounding the platen 17. The link 32 is pivoted to an arm of an offset rocker for actuating a link 34 which in turn is pivoted to the corresponding actuating goose neck of the accounting mechanism to be described later.

Each cam 27 carries a pin which in normal position holds a spring urged rocker supported hook 35 in effective position, but as soon as the cam 27 passes beyond normal, the spring attached to the lower end of the rocker which supports the hook 35 causes said hook to move rearwardly and to rock a universal bail carried by the shaft 36 to rock the arm 37 into the ball lock 23 and thus prevent depression of any key as long as cam 27 is out of normal position. The shaft 36 has fixed thereto an arm to which is pivoted a light link 38 for rocking a channel bar 40 and thus separately lock all keys other than the numerals, against operation as long as cam 27 is in an abnormal position. This alphabet key locking arrangement is old and well known and has been used for years on the machine known on the market as the Remington bookkeeping machine.

Soon after spring urged pawl 24 rocks the bell crank 25 it is forced off the ledge of said member 25 by the ascent of the extreme forward end of arm 30 and thus prevents more than one rotation of the cam 27 if the operator should hold his (her) finger on the key 22. As soon as pawl 24 is forced off the ledge of lever 25, the latter snaps to normal position in readiness to disengage pawl 26 from the element fast to rotating shaft 28. If the numeral key 22 is still held down, all other keys remain locked, and all elements set in motion in response to the key are at normal, except pawl 24, due to the positive rocking thereof by arm 30. The pawl 24 can ride on the shoulder of bell crank 25 after the numeral key 22 has risen to normal position, and then only. The operation of a key responsive machine, therefore, simulates the operation of the familiar manual machine.

Figure 3:
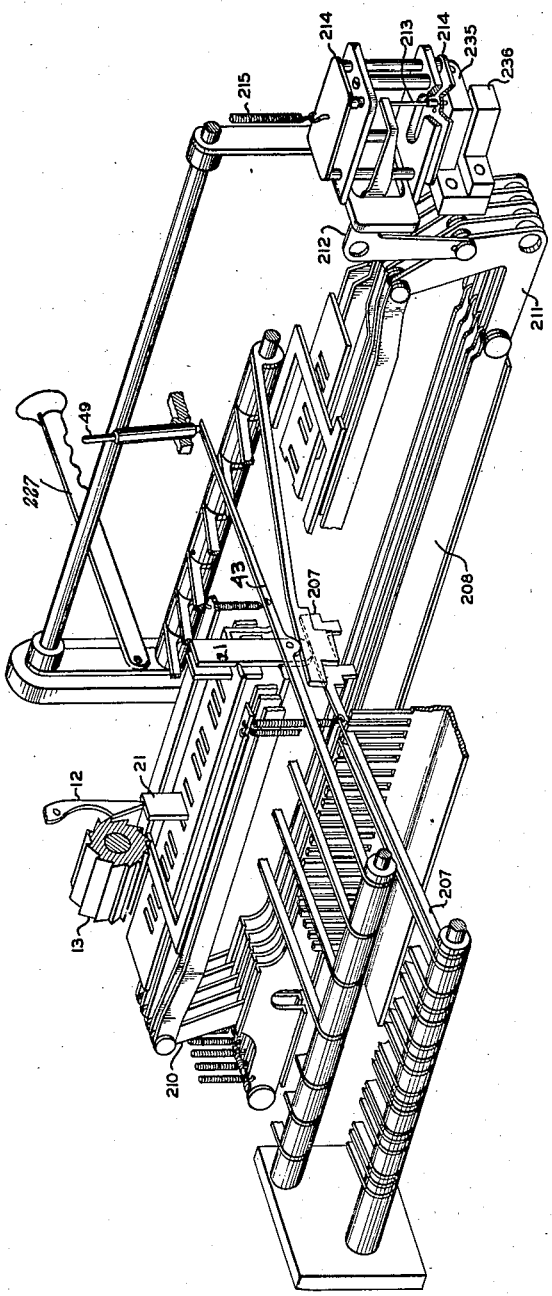
Fig. 3 is an isometric view of the tape punching mechanism.

The extreme rear end of the arm 30 carries a pin or roll 41 for rocking a cam 42 which in turn operates a spring urged plunger 49 to actuate a tape punching lever 43 as shown in Figs. 1, 2, and 3. As hereinabove stated, the tape punching mechanism will be described in detail later.

The cams 42, bell cranks 25, and rocker supports for hooks 35 are carried by an intermediate frame 44. The said frame is slotted at its rearward end to form guides for the cams 42 and is additionally slotted longitudinally to receive a universal shaft on which all said cams 42 are pivoted. The said supporting shaft is held at the bottom of the slit by a series of clamps 45. The forward edge of frame 44 is similarly slotted for carrying a universal shaft for supporting the bell cranks 25 and the rockers which support hooks 35. The lower ends of said rockers are connected by suitable springs to an anchor at the extreme lower forward corner of said frame 44. Suitable adjusting screws may be studded into the frame 44 to facilitate the adjustment of all parts cooperating with members 36, 24, and 41.

*Fractional and special keys*

The typewriter is provided with four fraction keys, viz., 1/4, 1/2, 3/4 and /8. Each of these keys must effect a distinctive perforation on the tape. One arrangement of the fraction keys is such that the /8 is identical with 1, 1/4 is the same as 4, 3/4 is the same as 6; in other words the code is arranged as if the fractions were expanded into eighths. Such a system of perforations is most readily obtained by paralleling the /8 key with the 1 key. The remaining keys are operated with the corresponding even digits noted above and also with the bottom of the 1 key.

Special keys may be used for special printing such as:

1 for Dz. Dozen
2 for Lg. Large
3 for Md. Medium
4 for Sm. Small
      etc.

The fraction keys of the typewriter are distinct from the numeral keys but their connections are parallel as described. They are optional and may be omitted entirely.

Space bar

Figure 5:
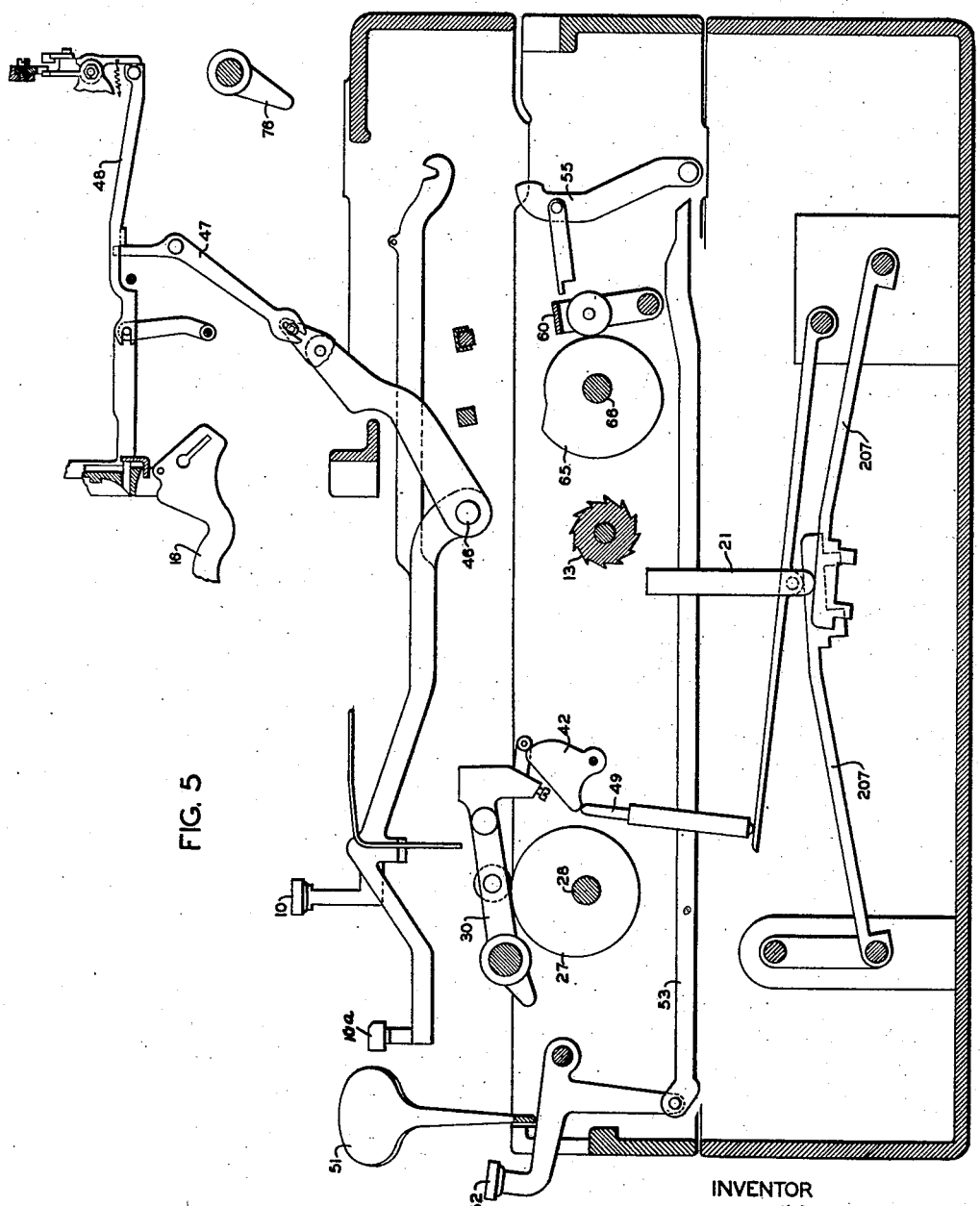
Fig. 5 is a diagrammatic view showing the positions of the most important parts.

The typewriter space bar 10a (Figs. 1 and 5) bridges a pair of arms fast to the shaft 46, to which is also fast an upwardly and rearwardly extending arm connected by an adjustable pin to a spring urged rocker 47 for shifting a turned over lug, on the dog rocker bar 48, rearwardly to operate the escapement for the paper carriage (Figs. 5, 13, and 27). The forward end of the bar 48 is carried by an arm of a spring pressed rocking frame which supports arms of the escapement actuating arc which in turn is shifted rearwardly by a heel on each character type bar 16 when the latter is actuated as has been described hereinabove.

Power tabulator

The operation of the power tabulator used in this machine may easily be seen in Fig. 2 and Fig. 5. When the "white" tabulator key is depressed, the long rod 53 is moved rearwardly causing the vertical lever 57 to rise due to the action of its roller on the cam surface of rod 53. There is one vertical lever 57 for each tabulator key. The lifting of a lever 57 causes the notch of its corresponding member 58 which rests upon the upper end of 57, to become interposed in the path of the cam urged universal bail 60. Also, the lifting of a vertical lever 57 causes a notch in the side of said member to rock a universal bail 61 a projection of which lifts the vertical lever 62, through its roller and against its spring. Pivoted to the lower end of lever 62 is a tripping bell crank 63. The lifting of lever 62 rocks the lower arm of the bell crank 63 out of engagement with the spring pressed pawl 64 pivoted upon cam disc 65 to connect the latter to the constantly rotating shaft 66 through a clutch element rigid with said shaft. A second cam disc 67, fixed to the cam disc 65, has riding on its periphery an arm 68 pressed downwardly by a strong spring which causes a roll on the arm to follow the contour of said cam 67. The cam 67 is provided with two sharp rises against which the roller of the arm 68 rests when the cam assembly is disconnected from its clutch element. This construction avoids erratic clutching and restoring action of the cam 65.

The cam 65 is rotated in a clockwise direction (as viewed in Fig. 2) approximately a quarter of a turn then the spring pressed pawl 64 is disengaged from the constantly rotating shaft 66 by the action of the hooked upper end of the bell crank 63 which has been rocked into lower position by the upward action of the lever 62. In this position the roller on the supporting arm of the bail 60 has ridden to the high dwell of the cam 65 thereby causing said bail 60 to force rearwardly the arm 58 pivoted to the rocker 55 which through the interponent 56 rocks the lever 54 to interpose a stop into the path of one of the adjustable tabulator stops.

When the tabulator key is released, the roller of the lever 57 allows said lever to drop releasing the rocking bail 61 thereby allowing the lever 62 to be pulled downwardly by its spring to rock the upper hooked end of the bell crank 63 out of engagement with the pawl 64 to allow said pawl to reengage the cam assembly on the shaft 66. When the upper end of bell crank 63 is rocked out, the lower end is rocked into the path of the pawl 64, consequently disengaging the clutching mechanism when the cam assembly rotates to that position. When the vertical lever 57 has dropped to normal and the roller fixed to the arm of the bail 60 has followed the cam surface of cam 65 to its low dwell, the arm 58 is held down by the spring urged bail 70.

When the lever 54 is rocked, the escapement wheel is thrown out of engagement with its rack through a well known series of links and levers as may readily be seen in Fig. 2.

Skip palm tabulator

The palm tabulator is a lever 51 (Figs. 1, 2, and 6) which extends upwardly to the left of the key board of the Remington electric bookkeeper, in such a way and position as to be easily struck by the operator, to initiate a tabulator operation. Said palm tabulator 51 operates on the shank of the "white" tabulator key 52, the lower arm of which is connected to a long rod 53 for rocking a spring pressed arm 54 (Figs. 1 and 2) at the rear of the machine. Between the arm 54 and the tabulator rocker 55 is a floating interponent 56. This construction is adapted to permit the typewriting machine to be tilted relative to its operating base as described in the cited Hart application S. N. 510,941. Each of the tabulator rockers is arranged to interpose its extreme upper end into the path of one of certain prearranged tabulator stops. Each rocker 55 operates a universal frame to lift the feed rack bar out of mesh with the feed pinion as is set forth in detail in the cited Hart application.

Power driven carriage return

The power driven carriage return is best shown in Figs. 2, 7, 8, 9, and 10. When the hand carriage return lever 71 (Fig. 2) is depressed, it rocks the shaft to which it is attached and thereby rocks the arm on the far end of the shaft. Lying in the path of the arm is a pin projecting from a bell crank 72, which crank is loosely pivoted on the shaft, thus when the shaft is rocked, bell crank 72 including the long slender hook forming one arm thereof, is also rocked. Said hook is urged downwardly by a suitably located spring which also extends to a projection on the latch 73, but said hook is normally held in engagement with said pin by a stud 79 projecting from the cam link 74, and extending below the shank of said hook. Therefore, when the long slender hook moves forward, latch 73 is withdrawn, and arm 75 snaps upwardly under tension of a suitably located spring, rocking its supporting shaft to:

1. Lock all typewriter keys against operation by causing arm 76 thereon to shift link 77 (Fig. 2) forwardly to rock the channel member 40 into engagement with the hook-like projection on the alphabet keys. This forward motion of link 77 also rocks the arm 37 through link 38 into the ball lock 23 thereby locking the numeral keys.

2. Enable two clutches by means of arms 80 and 81 to connect the motor drive of the snatch and cam rolls to the carriage return shaft.

The forward end of arm 80 has a pin extending into a groove of a clutch element (Figs. 2, 7, 8, and 9) for connecting the shaft 82 to a worm-driven gear loosely mounted thereon. Mounted on the upper end of shaft 82 is a pinion which meshes with a rack 83 on the frame of the carriage 84. If desired, the pinion on shaft 82 may mesh with a larger gear which in turn drives a common form of speed limiting device, as is fragmentarily shown in Fig. 8.

The forward end of arm 81 extends into an opening of a frame supported bell crank to shift a clutch element into engagement with the worm 85, or its stub shaft, to connect the power driven pulley 86 and its stub shaft to said worm 85 to drive the gear loose on shaft 82, and thence said shaft, its pinion and finally the rack 83 on the frame of the carriage. This train of mechanism remains connected as long as arm 75 is in its elevated position. Mounted on the frame of the carriage is a pair of adjustable margin stops 87; the one for initiating the automatic carriage return connections and the other for breaking them. When the carriage has reached home position, the force resulting from absorption of its momentum is transmitted through a margin stop 87 to a projection on link 88; thence to a link and a spring urged frame supported bell crank 90; thence to camming bar 74, drawing the latter in a generally forward direction. A cam towards the rearward end of bar 74 forces a roll on arm 75 downwardly and hence restores said arm 75, its shaft, and all parts operated thereby to normal position. When bar 74 moves as described, the long slender hook pivoted to bell crank 72 is permitted to descend, thus disabling its possible action on latch 73.

The forwardly extending arm of bell crank 72 is connected by a link to a frame supported bell crank which in turn is joined to a bar 91. When the typewriter carriage has traveled in the writing direction, a distance corresponding to the adjustment of margin stop 87, the link 91 is shifted to rock bell crank 72 in substantially the same manner as has been described above for the operation of key lever 71, thus automatically initiating the carriage return operation described.

Power driven back space

The power driven back space is shown in Fig. 6. When the back space key 92 is depressed, the rod 93 is forced rearwardly against the tension of its spring, to push the latching lever 94 out of engagement with the spring pressed pawl 95 allowing said pawl 95 to connect the cam disc member 96 to the constantly rotating shaft 66, thereby causing said cam 96 to rotate in a counter clockwise direction (as viewed in Fig. 6) to lift the lever 99 against the tension of a spring, to actuate the back space mechanism, through the link and levers shown in Fig. 6. As the rod 93 travels rearwardly forcing the latching lever 94 from the step of pawl 95, its rearmost end is also lifted by the action of its cam-like end on a rigid rod to clear the upper extremity of latch lever 94 allowing said lever to snap back under tension of its spring, to its original normal position where it will catch the pawl 95, disengaging the cam 96 from the constantly rotating shaft 66 after one revolution of said cam 96. The mechanism 97 is the usual Remington back space which forces a backward stepwise relative movement between the escape wheel and the element 98.

Power driven case shift

The power driven case shift mechanism is shown in Fig. 11. When the case shift key 100 is depressed, its spring urged arm 101 is rocked. A lever 102 connected to the arm 101 by a pin and slot connection is rocked by said arm to depress a vertical spring urged interponent 103 which in turn forces a spring urged latching member 104 out of engagement with a spring pressed pawl 105 pivoted to a cam disc 106, (the pawl 105 is shown broken, but is similar to other pawls of the same nature shown in other parts of the drawings), allowing said pawl to connect said cam disc 106 to the constantly rotating shaft 66. Also, when the case shift lever is depressed, a pin in the rearmost extremity of arm 101 is rocked upwardly allowing the spring of latch lever 107 to rock said lever forwardly until stopped by the roll on arm 108 where it is held resiliently by its spring. As the cam 106 which has now been connected to the shaft 66, rotates in a counter clockwise direction (as viewed in Fig. 11), its rising periphery contacts a roll on interponent 103 forcing the step at the lower end of said interponent off of the pin of the spring urged latch arm 104 thereby allowing said latch arm to resume its normal position in the path of the pawl 105. Latch arm 104 is properly stopped by an adjustable stop. When the high point of cam 106 rocks the arm 110, pivoted to a shaft carrying a somewhat similar arm on its other end, a pair of arms 111 (one not shown) are lifted by a pair of pins extruding from the extremities of said arms 111, thereby lifting the platen assembly which rides on a cylindrical member 109 supported by the two arms 111. A pair of counter balancing springs aid in lifting the platen. As the arm 110 is rocked by the cam, it contacts a pin fixed in arm 108, which rides freely on the shaft of 110, carrying said arm 108 upwardly with it. The roller of 108 rides upwardly against the now resiliently urged latch lever 107 until it snaps into the notch in the upper end of said latch 107, thereby holding the platen in its shifted position until the key 100 is released. The cam assembly continues to rotate until it has made a full revolution when the pawl 105 strikes the latch member 104 thereby releasing the clutching mechanism. The return of the platen to normal is effected by the return of the key 100 to normal which rocks the pin in the rearmost extremity of lever 101 downwardly forcing the latch lever 107 out of engagement with the roll of arm 108, thereby allowing the platen to drop to normal position by its own weight against its counter-balance springs.

Computing mechanism

The computing mechanism associated with the typewriter is essentially that disclosed in the patents to Wahl No. 1,270,471, granted June 25, 1918, and Wahl 1,349,024, granted August 10, 1920. Certain modifications have been introduced into this mechanism such as those disclosed in the application of Hart cited hereinabove. The essential elements of this mechanism and their relative arrangements will now be described. Reference to Figs. 12, 13, and 14 shows that the typewriter is arranged to carry a plurality of columnar totalizers at any desired location on a truck 112 and two cross-footing totalizers on a reciprocatory cross truck (see Figs. 12 and 13). All of the columnar totalizers are operated by a single master wheel and each cross-footer is provided with an individual master wheel. The computing state of the columnar totalizers (i. e. the direction of rotation of their master wheel) is manually controlled and the computing state of each of the cross-footers is automatically controlled by cams 113 (Fig. 12) carried by each of the columnar totalizers and is set when each columnar totalizer arrives at the computing zone. The numeral keys are locked against operation unless both a columnar totalizer and a cross-footer are in position to receive an item. Special provision is made for certain interlocks controlling clear signs for the cross-footers. The briefly specified mechanism will now be described in sufficient detail, with the aid of Figs. 1, 2, and 12 to 19, inclusive, to enable any one skilled in the computing machine art to readily understand, construct, and use the mechanism as modified in the present instance.

The columnar truck 112 is loosely connected to the paper carriage in the usual manner and is accurately supported and guided at the computing zone by the usual adjustable roller guides and supports shown in section in Fig. 12. The truck 112 is contoured in the usual manner to accommodate said mechanism, and it is crenelated for accurately locating the columnar totalizers. The cross truck 114 (Figs. 13 and 14) is provided with the usual notched blocks for locating the cross-footing totalizers, the guiding rollers for easy transverse movement, the long coil returning spring passing over a pulley, the adjustable limit stop which cooperates with the lever 328 (Fig. 20) the bracket for the pivot of the pick-up beams, the aligning crenellations for engagement by the master dogs, etc. The pick-up beam is shown in Fig. 22. It consists of the spring urged cam controlled hook 116 (Figs. 14 and 22) and the spring urged cam controlled latch 117, pivoted on an offset bracket on the cross truck 114; said bracket also serves as an anchorage for the short stout springs which urge these members upwardly to effective positions. When the pick-up tail of a columnar totalizer passes over members 116 and 117, it is engaged by the triangular projection on the hook 116, and, as soon as the cross truck is moved, latch 117 moves upward, due to the disengagement of its hook cam from a pin on graduated cam guide 118, to prevent rebound of the cross truck with respect to the main truck. When cross truck is ready to be released a pin on the hook 116 passes downwardly in a cam slot in the framework and is thus disengaged from the pick-up tail of the columnar totalizer. The triangular projection on hook 116 permits free return of the main truck and its totalizers during a carriage return operation.

Figure 19:
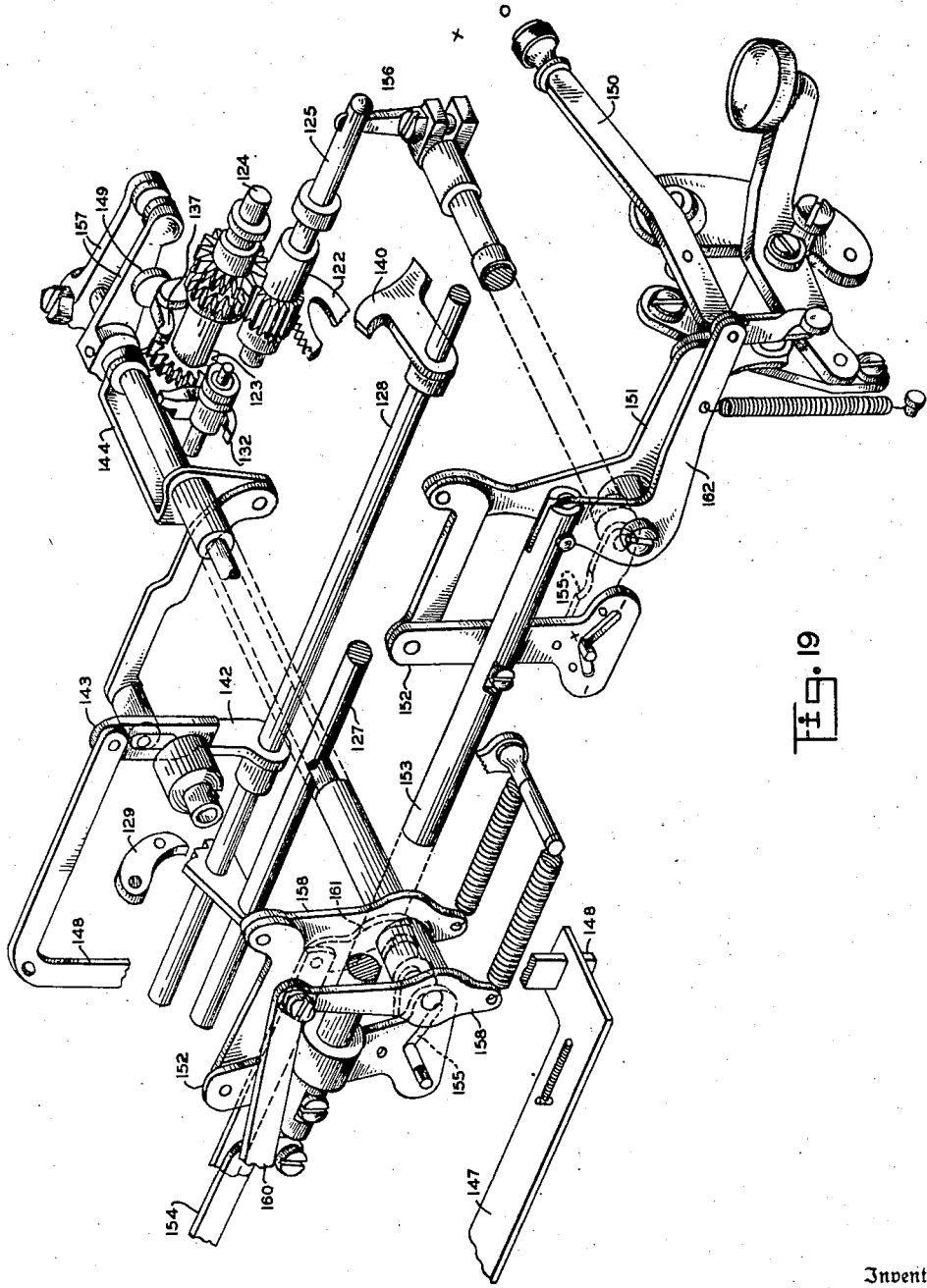
Fig. 19 is a partially exploded view of the state control and correction mechanism for the vertical totalizers. All the supporting framework is omitted from this figure for the sake of clarity.

The movement of each actuating lever 30 (Fig. 1) is transmitted through a link 32 extending upwardly to an idle rocker; thence upward through link 34 to a fan 119 (Fig. 12). Each fan 119 is connected by a slot-and-pin connection to a goose-neck 120 for driving the differential shaft 121 having arms spirally arranged to transmit movements commensurate with the value of the numeral key mechanism; thence to the controlled swinging sector 122; thence to the master wheel 123 through its shaft 124, and a gear thereon, either directly for adding operations, indirectly through an idler on shaft 125 (Figs. 17, 19, and 20) for subtracting operations, or not at all, for non-compute operations, and thence to a totalizer carrying wheel 126. Reference to Figs. 19 and 20 shows three master wheels with the reference character 123. The master wheels of Fig. 20 drive the carrying wheels 126 of the cross-footers, and the master wheel 123 of Fig. 19 drives the carrying wheels 126 of the columnar totalizers. The sector shaft 121 is connected by a crank, a link, and a similar crank (see Fig. 23) to a corresponding sector shaft for driving the master wheels of Fig. 20 by mechanism exactly like that shown in Figs. 12 and 17 as in the cited Wahl patent and in the Hart application. Certain universal operations must be performed by a fan cam 119, most of them before the master wheels can be driven. These are:

1. Set a full stroke mechanism and block all other numeral key mechanism during the time of operation of that key mechanism which is set.
2. Unlock the sector shafts 121.
3. Lock the totalizers in position to receive an entry.
4. Disable the tens-carrying train at the next lower denominational order.
5. Block the numeral key mechanism in a punctuation space.
6. Unlock the master wheels for operation.
7. Eliminate spiral in the totalizer.
8. Shift the sectors 122 to engage the master wheel driving trains.
9. Lock the state control mechanism in adjusted position during a stroke of the numeral key mechanism.
10. Block operation of the numeral key mechanism in the event that the totalizers are not properly positioned.

These functions will be described in the order given, and each is initiated by a lug on the operated fan cam 119 contacting with and rocking a bail 127 on the universal shaft 128. This shaft, like shaft 121, is connected to a corresponding shaft for the cross-footers. (See Fig. 23.)

1. This is a purely optional condition of the electrified machine inasmuch as the previously described ball lock mechanism shown in Fig. 1 replaces this function. If the full stroke and single key mechanism is retained it is precisely the same as that shown and described in the cited Wahl Patent 1,270,471, including the pincer centralizing mechanism for shaft 128. If this mechanism is not included then a special pincer centralizing mechanism (Fig. 23) must be supplied.

2. The sector shaft 121 is spring urged towards normal position, and is normally locked in the position shown in Fig. 12 by a spring pressed pawl (not shown) whose tail lies in the path of bail 127, and when shaft 128 is rocked by a fan said pawl is disabled. The "disconnect lever" (not shown) rocks said pawl to ineffective position and also rocks shaft 128 through bail 127 anti-clockwise, (as viewed in Fig. 12) to disable the entire computing mechanism. It is to be understood that all elements controlled by this shaft have pin-in-slot connections, or an equivalent thereof, to permit the operation of the disconnect lever.

3. Said shaft 128 is provided with a forwardly and downwardly extending arm to which is connected the link 130 (Fig. 12). Said link through a pin-in-slot connection, is connected to the rockable cam 131, whose cam slot embraces a pin mounted on an arm of the master dog 132, so that rocking of said dog in an anti-clockwise direction causes its rearwardly extending arm to enter an interdental space on a toothed rack near the forward lower corner of the columnar totalizer truck 112. Engagement of the master dog with said rack also relatively positions the master wheel and the totalizer. Usually the master wheel is loosely mounted and is embraced by a fork of the master dog so that the master wheel is shifted slightly by the master dog. (See the patent to Poole 1,314,094.) An identical mechanism is provided for each cross-footer.

4. The tens-carrying or transfer mechanism is essentially a simple form of Geneva gear system arranged according to the computing radix. Each denominational Geneva carrying wheel is carried by a spring pressed arm 133 (owing to very severe space limitations, these arms are alternately arranged on parallel shafts, and the lowest order arm is a mere locking pawl) whose extreme lower end is at times in the path of the offset (with respect to the master wheel) vertical finger of master dog 132. Hence, counter-clockwise rocking of the said dog will rock the tail of that arm 133 into a notch in the framework adjacent the master wheel (see frame element partially obscuring the master wheels in Fig. 13). The arm 133, which is rocked, corresponds to a transfer into the wheel 126 to be actuated by a numeral key mechanism, thus freeing it for operation. All the arms 133 are normally free to be rocked, but as soon as one of them is moved by the master dog 132, the extreme upper end of the lever 133 rocks a universal locking shutter 134 to lock all other arms 133 in normal position. Each totalizer frame is provided with an extension simulating the tail of an arm 133 to lock the master dog, and thereby the computing mechanism against operation in the sub units position of the carriage. (See columnar totalizer in Fig. 13.) An identical mechanism is provided for each cross-footer.

5. The computing mechanism must be locked when a number punctuation space, such as for commas and decimal points, is reached. The tail of each arm 133 adjacent to the lower denominational side of the punctuation space is somewhat longer as is indicated in Fig. 12 and the master dog 132 is provided with a broad, short, vertical finger, (see Figs. 19 and 20) adjacent to the long finger. Therefore, when the totalizer reaches a punctuation space the short finger of the master dog will strike the long tail of the arm 133, but said arm cannot be moved for the notch in the framework which receives the shifted tail of an arm 133 can accommodate one of them only, thereby locking the numeral key mechanism against operation and such operation can be resumed only after actuation of the space bar or other regular character key such as the comma, period, etc. An identical mechanism is provided for each of the cross-footers.

6. The master wheel 123 is normally locked against operation by a pawl 135 pivoted on shaft 136. Said pawl is provided with a cam slot (not shown) which embraces a pin on an arm fast to shaft 128, the construction and arrangement being such that clock-wise motion of shaft 128 rocks pawl 135 out of engagement with the master wheel. An identical arrangement is provided for each of the cross-footers.

7. Spiral effect in the totalizer carrying wheel 126 is eliminated by a stud guided cam pawl 137 (Figs. 17, 18, and 20) pivoted on 136 (Fig. 12). A pin moving with cam 131 is embraced by a slot (not shown) in the plate of pawl 137, the construction and arrangement being such that the pawl 137 is given a slight movement to take up lost motion spiral as in Wahl Patent 1,148,733, granted August 31, 1915. An identical arrangement is provided for each cross-footer.

8. The sector 122 normally lies to one side of the twin gears on shaft 124 and is held in this position by a notch in frame supported slide 138 (Fig. 17), which, in turn, is shifted by the helical cam 140 passing through a notch in the lower side of said slide. The construction and arrangement is such that the sector 122 is engaged with a gear of the master wheel train as soon as shaft 128 is rocked by a fan 119 but before the fan actuates its corresponding gooseneck 120, and drops to about normal as soon as the fan ledge passes ball 127 near the extreme of the down stroke of link 34. An identical arrangement is provided for each cross-footer.

9. When the computing mechanism starts operating, it is necessary to lock the master wheel gear train in the adjusted position of computing state. The pin of a crank fast to shaft 128 extends into a slot at the lower end of the lock plate 141 (Fig. 17) to rock the extreme upper edge of said plate into a notch (not shown) of the sliding shaft 125 of the idler of the master wheel train. An identical mechanism is provided for each cross-footer.

10. If the columnar and cross-footing totalizers are in abnormal positions, the shaft 128 is locked against operation. Fixed to said shaft is an arm 142 in proximity to a floating lock lever 143 whose position is controlled by the positions of the cross-footer truck and the columnar totalizers (see Fig. 19). The positions of 143 are:

a. Cross truck disengaged; 143 is in lowermost position;

b. Cross truck engaged; 143 is in uppermost position;

c. Columnar totalizer in a computing field; 143 is in path of 142; and d. Columnar totalizer out of computing field; 143 is out of path 142.

Arm 142 is blocked by combined conditions a—c only. It is free at all other times. Floating lock lever 143 is swung sidewise by a link connected to the downwardly extending arm of bail 144 which carries a roll 149, which is pressed downwardly against a light spring when said roll cooperates with a cam inside the case of a columnar totalizer, as shown in Fig. 12, and when the totalizer passes out of the computing field the spring restores the parts to normal. Floating lever 143 is lowered when the spring urged cross truck abuts the upper end of lever 146 and draws link 147 against the tension of its spring (see Figs. 19 and 20) to rock bell crank 148. When the cross truck is "picked up", the spring attached to link 147 elevates the floating lever 143.

The shaft 128 is normally free to rock against the action of a spring urged centralizing gripper (not shown) but is locked by a spring urged pawl 129 (Fig. 19), in case differential shaft 121 has not yet returned to normal position. Said pawl is held disabled by an arm (not shown) fixed to the differential shaft 121 when the latter is in home or normal position.

*State control*

The state control of the columnar totalizers is manual and that of the cross-footers is automatic. The manual state control lever 150 (Fig. 19) is connected by a twisted link to the horizontal arm of bell crank 151, the vertical arm of which is connected by a link to the upper end of the first (or columnar) of three floating state control levers 152. The second and third floating state control levers are identified each with one of the cross-footing totalizers. Two of the levers 152 are loosely pivoted near their centers to a rod 153, the third lever 152 is pivoted to a short rod 153 (see Fig. 20) which is connected through a rocker and a link 154 to the long rod 153. Several apparently dis-similar elements have been given the same reference character. This has been done purposely, because of the great similarity in function and operation. The lower end of each lever 152 is provided with an inverted V-shaped cam which embraces the pin of a crank 155 fixed to a shaft carrying arm 156, the upper end of which fits into a recess of the idler carrying shaft 125 (see also Fig. 17). The idler on shaft 125 is provided with a long grooved hub and the hub of the dual gears on shaft 124 is similarly grooved. The dual gears are provided with a long spline fitting into a deep notch of the master wheel hub so that the dual gears can move relatively to the master wheel. Fitting in these grooves is a lever 159 pivoted at a point midway between shafts 124 and 125 which constitutes an indicator of the relative positions of gears and hubs; it being noted that said hubs always move in relatively opposite directions. The lever 150 and, therefore, the indicator lever 159 may occupy any one of three positions — (or subtraction); 0 (or non-compute); or + (or add). A corresponding set of three positions may be assumed by 125, 156, 155, 162, and 151. Similar positions are possible for the elements connected to or controlled by the other levers 152, which, however, are automatically controlled by any prearranged combination of the sets of three-level cams 113 (Fig. 12) attached to the columnar totalizers. Each of these cams is arranged to rock a roll carrying lever 157, one of which (the outermost) is fixed to a shaft, and the other to a sleeve surrounding said shaft. The rearward end of the shaft has fixed thereto a spring urged arm 158, which is connected by a long link 160 to the upper end of the third or last floating lever 152 (Fig. 20) and the rearward end of the sleeve is fixed to similar spring urged lever 158, which, in turn, is connected by a short link to the upper end of the second or middle floating lever 152 (Fig. 19). The crank 155 of the middle lever is fixed to a shaft which carries an arm 161, which, in turn, is connected by a link to a lever for shifting the middle idler shaft 125. The third or last floating lever 152 rocks a crank 155 to shift an idler shaft in exactly the same way as has been described for the first or columnar gear shift.

Each of the gear shift trains, as described, is an independent train of mechanism and is independently adjustable to any one of the three possible computing positions; nevertheless, the mid points of all three of the floating levers 152 are pivoted on the connected slide rods 153; advantage is taken of this fact for simultaneously reversing all of the gear shifts irrespective of their particular adjustments; such reversal being effected by manually shifting the bars 153 by rocking bell crank 162 (Fig. 19) against the tension of a strong spring by means of the correction key. The term "reverse" means that any — setting is changed to a +; any + setting is changed to a —; and any 0 is retained. The construction and arrangement is such that either lower end of the inverted V slot in the levers 152 represents a —, the apex a + and the middle of the legs represents a 0. The example given is illustrative only, for the arrangement may be the exact reverse, as in the case of the last floating lever. The lever 150, or levers 157, shift the top of a lever 152 along one leg of the inverted V cam only, but the universal correction key shifts all the levers the same amount (an amount corresponding to the length of one leg of the V cam slot) and thus brings the opposite position or other leg of the inverted V cam into play on the state control crank pins. The indicia marked on the first floating lever 152 shows how reversal actually occurs. The reversing mechanism is used for making corrections and for erasing negative totals. Thus, if the operator touched the wrong numeral key, correction may be effected by depressing the correction key after a back space operation, and again touching the wrong key (usually a block is inserted in front of the type to prevent a second printing of the wrong digit) and the incorrect digit inserted in the totalizers will accordingly be erased. The incorrect digit on the work sheet is erased in the usual way.

*Totaling*

In every case totals are taken from the totalizers (columnar and cross-footers) by subtracting the total when the totalizer is over its master wheel. Four cases arise:
1. Total on columnar totalizer is positive;
2. Total on columnar totalizer is negative;
3. Total on cross-footer is positive, and
4. Total on cross-footer is negative.

1. The great majority of amounts or items added into the columnar totalizers are positive, and, therefore, the totals are ordinarily positive. The lever 150 (Fig. 19) is set for addition and remains there until columnar totals are extracted, then said lever is shifted to its lowest or negative position and the total is copied from the totalizer when it arrives in the computing field.

2. Negative amounts are entered into the columnar totalizers by shifting the lever 150 to — position, or by rocking the credit balance key 163 (Fig. 21) if it is desired to write them in red. If the total is negative (as indicated by nines in the highest denominational orders, or by the negative wheels of an algebraic totalizer if such is used (the lever 150 is shifted to + or add position, and the total is written in the usual manner.

3. The cross-footers are automatically controlled by cams on the vertical totalizers, and, when they are picked up in the column where their totals are to be yielded, the cam of the corresponding vertical totalizer automatically effects the necessary reverse corresponding to the requisite total condition and the total is written as above described.

4. If the total is negative it is necessary to reverse the automatic setting when a total column is reached. This is done by depressing the credit balance key 163 (Fig. 21) and writing the total in the regular way as described for negative totals in the columnar totalizers. If the cross-footer is an algebraic totalizer the visible negative quantity is copied (in red).

All the above conditions, except the last, are satisfied by the mechanism already described. The setting required for the last condition will now be described. The credit balance key 163 (Figs. 21, 22, and 23) is spring pressed towards normal and is loosely mounted about the shaft 164 of the bichrome ribbon mechanism. Said key has a pin-in-slot connection through link 165 with the correction key so that a depression of key 163 will result in a rocking of the correction key. The key 163 is connected by a spring pressed ball and notch, or an impositive latch (Fig. 14) with the well known bichrome shifting mechanism so that the ribbon mechanism is shifted to "red" when said key is depressed. If the ribbon mechanism is already in "red" the described connection slips so that there is no shifting. Beside the key 163 is a second or release key to release the spring pressed latch which is automatically operated to latch key 163 when the latter was depressed. Obviously, key 163, since it operates the correction key mechanism, results in reversing the state control setting of the totalizers when depressed, and, therefore, results in a clearing of the totalizer when the complement of the negative total is printed, and the printing of the correct amount in red.

Proof of clearance

It is highly desirable to have more than ocular proof of clearance of, particularly, the cross-footing totalizers. The mechanism shown in Fig. 18 (see also Fig. 25) is that for initiating the operation of the clear sign printing. Each number dial or drum is driven by the carrying wheels 126 (Fig. 12) through an idler and a mutilated gear 167 integral with said number dial. One of the teeth (usually that opposite 7) is considerably shortened so that, when all the dials or drums exhibit zero at the sight opening of the totalizer all the shortened teeth are opposite the feeling tines of the rake 168 (pivoted on the side plates of the totalizer), so that the said rake can rock slightly under influence of a spring attached to the bell crank 170, therefore, the vertical arm of this bell crank, which extends upwardly through the case of the totalizer, is a clear indicator. Advantage is taken of the position of the bell crank 170 to unlock the one or the other of a pair of normally locked special character keys to permit the printing of a special sign on the record sheet in juxtaposition of the total. Each arm 170, when in clear position, is in the path of a nose of a bell crank 171 (Fig. 20) which, in turn, controls a spring urged locking link 172. The end of each locking link 172, remote from the bell crank 171, passes through a slot (not shown) in the calculating machine framework, and lies in the path of the upper arm of a bell crank 173. Each of said bell cranks 173 is connected by a usual form of snap link to an offsetting rocker; thence by wires 174 (see Figs. 15 and 16), the one to the * key, the other to the △ key. These keys are constructed like the numeral keys and are operated in the manner described hereinabove (see Fig. 1).

When the total of one of the cross-footing totalizers is negative, it is desirable to print a special character differing from the regular positive clear sign. Fixed to the bichrome shaft 164 (Fig. 21) are arms 175 connected by light links to the respective selectors 176 pivoted on the key levers of the * and △ keys (Fig. 21). When the credit balance key 163 is at normal, lugs on the selectors overlay the forward ends of the key lever bell cranks 15, which operate type bars corresponding to the positive clear signs; but, when the credit balance key 163 is depressed, the selectors 176 are correspondingly shifted by the arms 175 so that a projection on each selector overlies the forward end of the adjacent key lever bell cranks 15, which operate type bars carrying corresponding negative clear signs. The clear signs may be arbitrary characters of various kinds such as are indicated in the following table:

|  | Positive | Negative |
| --- | --- | --- |
| ☆key......<br>△key...... | ☆<br>△ or — | CR<br>OD or ℂ |

It is thus seen that the clear sign indicia which will be printed depends upon the position of the credit balance key and the bichrome mechanism. It is to be understood that the projections on each of the selectors are so proportioned that one and only one of them can be effective on an adjacent key lever bell crank 15.

Automatic clear signals

Figure 24:
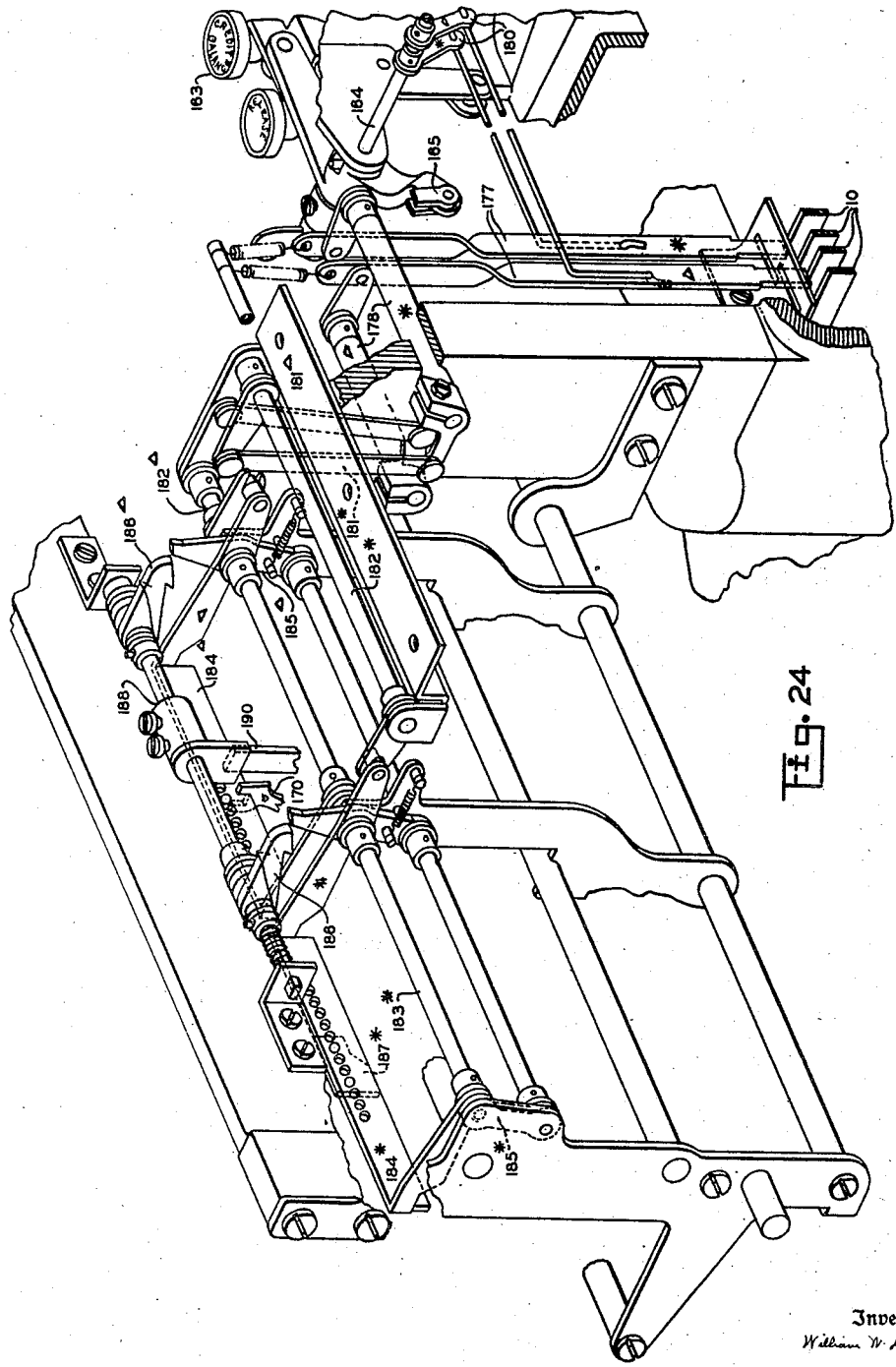
Fig. 24 is a diagrammatic isometric view of the automatic clear sign mechanism and its relation to the polychrome mechanism.

At times it may be desirable to print clear signals automatically as an incident to the printing of a total from a cross-footer or from both cross-footers. The mechanism for initiating the automatic operation of the clear sign printing is best shown in Fig. 24. Each selector of a pair of selectors 177 is pivoted to a crank arm on a shaft 178, and is connected by a light rod to an arm 180 fixed to the bichrome shaft 164. The selectors and elements cooperating therewith are identified by the positive clear signs. The foot of each selector is normally above a key lever of the corresponding clear sign, that is there is a selector 177 for the * key lever and another selector for the △ key lever. When the bichrome shaft 164 is rocked, the arms 180 shift the selectors so that their feet are over the CR and ℂ key levers, thus conforming to the table of clear signs given above. If either or both the selectors 177 are automatically depressed sufficiently to effect a key responsive action as has been described under the headings Numeral keys and Alphabet keys, one or more clear signs will be automatically printed, and the sign or signs printed will be determined by the position of the bichrome shaft and the selector or selectors automatically depressed. Each of the shafts 178 is connected by a crank thereon, a link 181, and a crank to a shaft 182. Each of the shafts 182 is connected by slotted arm and crank to a shaft 183 of a shiftable rocking frame 184, and each shaft 183 is carried by a rocker frame 185. The frames 184, when operated are at times shifted and at times rocked by the bell cranks 170 (Fig. 18), the positions of which indicate whether the corresponding totalizer is clear or otherwise; for the present purpose the upper ends of the bell cranks are bifurcated. (Figs. 11, 22, 23, and 24.) The bails of the frames 184 are considerably longer than the extent of travel of the cross-footers. The operation is best understood by assuming that the cross-footers are clear, then proceeding to accumulations and finally to clearing or totaling. When the cross-footers are clear the described elements have the positions illustrated in Fig. 26, that is, the bail of frame 184 rides in the bifurcation of the bell crank 170. When a wheel of the totalizer is operated the rake 168 and the bell crank 170 rock to the dotted position shown in Fig. 25, thus drawing the bail of the rocking frame 184 forwardly against tension of a spring until the long arm of rocker 185 snaps under the spring pressed latch 186. The described movement is slightly more than sufficient to permit latch 186 to hold rocker 185, as is indicated by the apparent interference of the dotted lines with bail of 184 in Fig. 25. Exactly the same operation occurs for both cross-footers. As long as the cross-footers are not clear, the bails of rocking frames 184 are held in the described forward positions, because of the length of said bails. When either cross-footer is cleared the bell crank 170 again occupies the position of Figs. 24 and 25, but the said bail is held forward by the latch 186. Mounted on each bail of rocking frame 184 is a cam 187 whose slanting face is in the path of the forward tine of the bifurcated bell crank 170. The cam 187 is adjusted so that it causes the said bail to be elevated as soon as the units digit of the total is printed. The parts are then in the position shown in Fig. 25, thus moving the train of elements, frame 184, shaft 183, shaft 182, link 181, shaft 178, selector 177 (against the action of its spring), and finally the key lever of proper indicia, according to the adjustment of the credit balance key 163. The selected indicia type then strikes upon the work sheet in proximity of the correct total, and such striking occurs as has been described under the headings Numeral keys or Alphabet keys. It now remains to disengage the latches 186. Each of the latches 186 is carried between collars on a spring urged shaft which carries an adjustable collar 188, which is struck by a projection 190 rigidly mounted on the cross truck 114, so that the said collar 188 is shifted when the cross truck is released, thus releasing the rocker 185 corresponding to the cleared cross-footer. The other bail of frame 184 is not released unless the corresponding crossfooter is clear, for it is otherwise held by bell crank 170 as above described. If desired an interlock such as shown in Fig. 20 may be used with the clear sign mechanism just described.

So far as described the clear sign for each cross-footer prints as soon as the totalizer is cleared, and the sign is printed in juxtaposition of the correct total. At times it is desirable to use both cross-footers as an algebraic totalizer, or to arrange the cams on the columnar totalizers so that the same quantities are accumulated in both cross-footers, but in differing order, or to use the cross-footers as checks for double entry accounts, or to set one of the cams 187 in advance of the other so that the bail 184 corresponding to the cross-footer which is cleared first is not elevated until the second cross-footer is cleared, etc., and to clear both simultaneously. In any of these cases both the bails of frames 184 arrive at the position shown in Fig. 25 simultaneously and, therefore, both selectors 181 are simultaneously depressed, thus securing simultaneous operation of the two type bars. The construction and arrangement is such that the signs identified with one cross-footer strike the work sheet through the center guide and the other at the side thereof as is best shown in Figs. 27, 30, and 31. The center guide 191 is partially cut away so as to permit printing. In any of the cited cases one or the other of the two pairs of signs ★, △, ⓒ, or CR, will be printed instead of any one singly.

The preceding description has tacitly assumed that each type bar 16 corresponding to the special indicia is provided with a heel to operate the escapement segment 50 (see Figs. 5 and 13). As a matter of fact these type bars do not operate the segment 50. It is, however, to be understood that said type bars 16 may operate the said segment if desired when the mechanism to be described is absent. Under the heading Space bar it was pointed out that the dog rocker is oscillated by shifting link 48; in the present instance said bar is provided with a pin standing in the path of the extreme upper end of a frame 193 which is rocked by the one or the other of two equalizers 194, when, and only when two paired indicia key lever bell cranks 15 are rocked as a result of the automatic shifting of both of the selectors 174. The mid-point of each equalizer is connected by a chain comprising an eye-bolt and light spring to the lower arm of the frame 193. The said spring is of a strength such that nearly full compression thereof is required to rock the frame 193 and hence to operate the escapement mechanism. Manifestly the machine will refuse to initiate the carriage return if the cross-footers are not clear.

The operation of each of the clear sign printing mechanisms has been described as being automatically initiated, but they have been shown as connected to an ordinary form of typewriter key mechanism and (slightly modified) type action. Sometimes it is desirable to initiate a special sign printing mechanism manually for the purpose of using a special character to identify or earmark certain items, therefore, all the key levers associated with the special signs are provided with the key caps. Further, two differing forms of clear sign mechanism have been described. In the case of the manually initiated clear sign mechanism, it is desirable to have the ★ and △ mechanism operate in a manner similar to the numeral key mechanism for the same reason that special operating mechanism is provided for the numeral keys, that is, to prevent breakage and an idle operation if the machine has positioned an automatic lock to guard against a misoperation. On the other hand, in the case of the automatically initiated clear sign mechanism, this is not necessary, therefore, the clear sign keys are arranged in any convenient manner. The particular arrangement shown is chosen because all the clear sign key levers are adjacent, for this construction simplifies the arrangement of the selectors, and hence most of the key levers are arranged as character keys.

*Power date printer*

Figure 33:
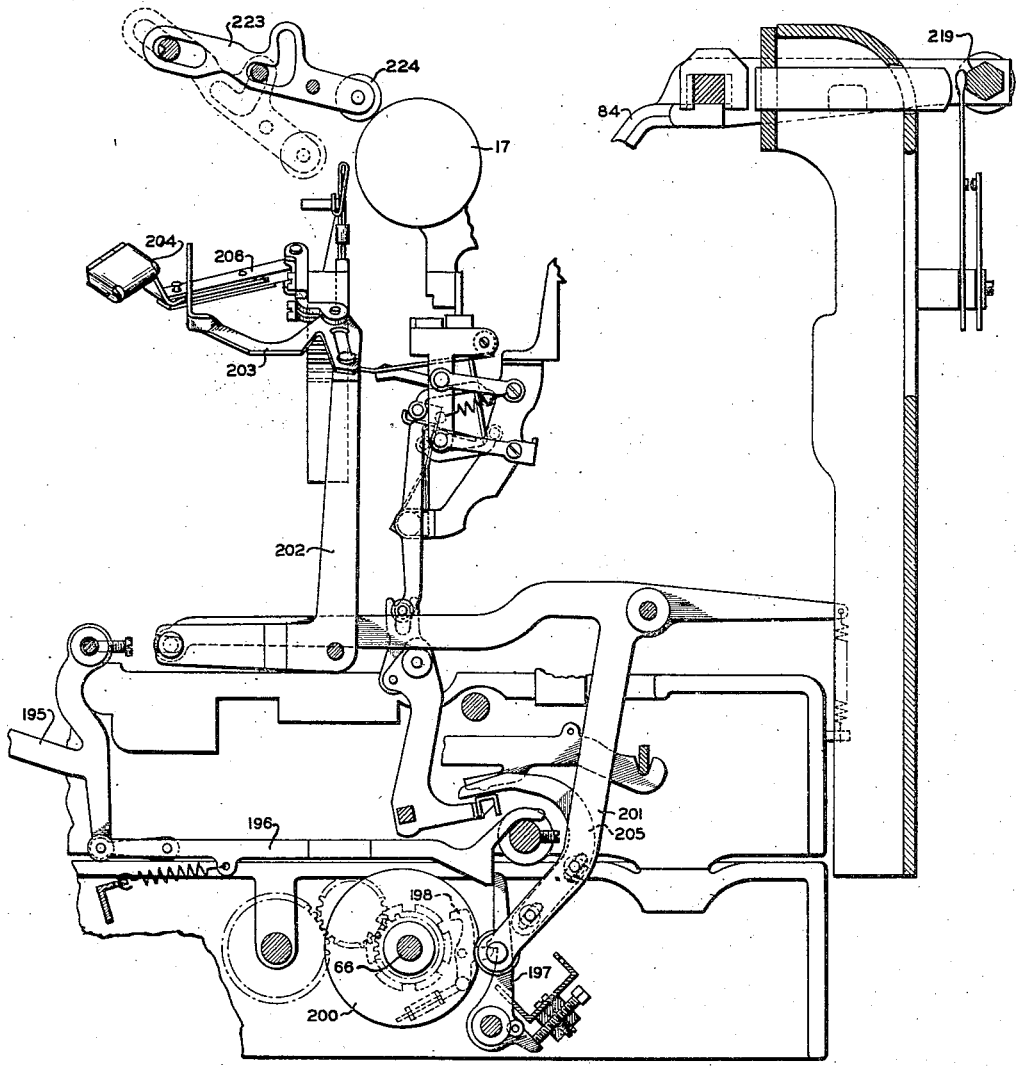
Fig. 33 is a view of the date printer, two positions of the front feed, and the control bar.
Figure 34:
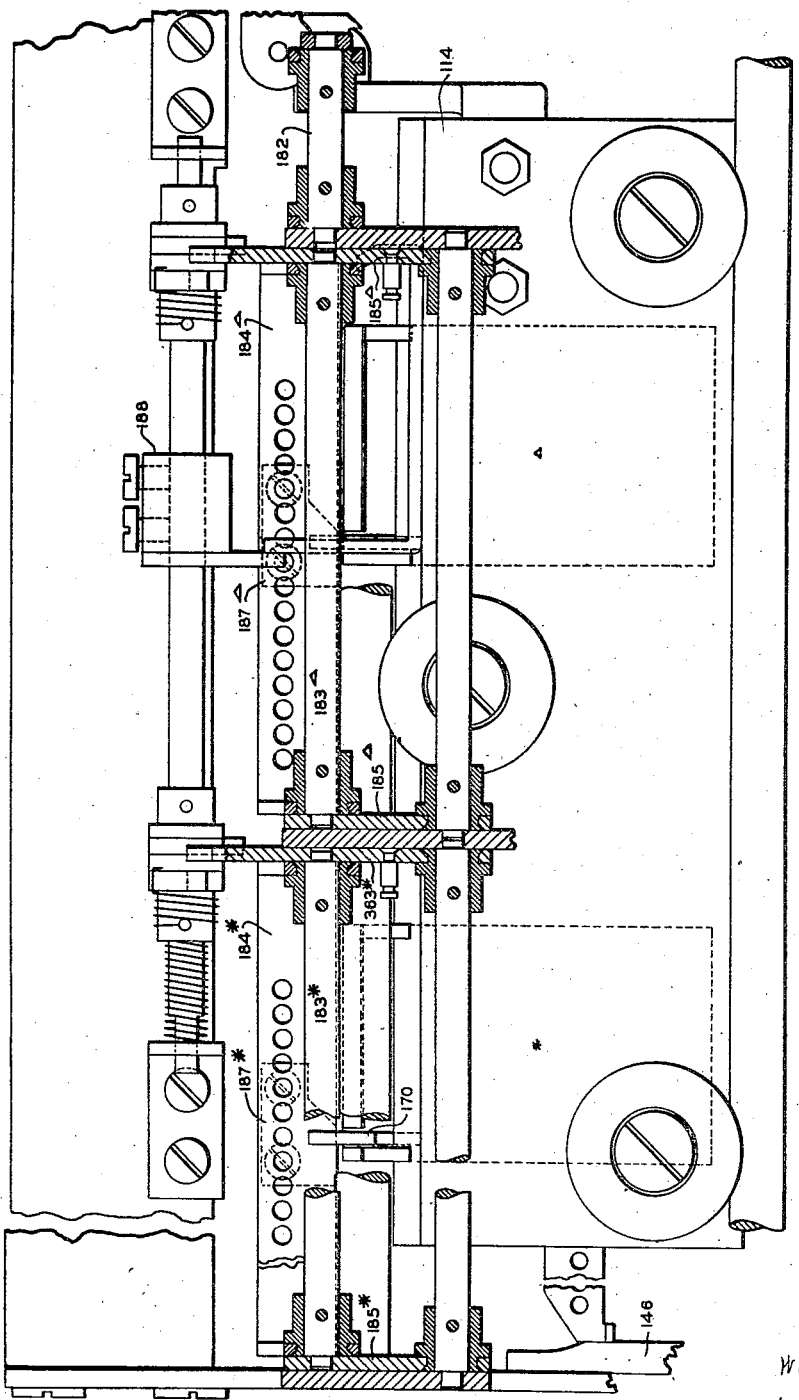
Fig. 34 is a view from the rear showing the relation of the clear sign mechanism to the cross-footer truck.

The power driven date printer is shown in Fig. 33. It is desirable to print the date by depressing a single key. In this invention this key is one similar in appearance and operation to the key used for operating the power back space mechanism hereinabove described (Fig. 6).

When the date printer key (not shown), fixed to the crank 195 is depressed, the rod 196 is forced rearwardly against the tension of its spring to push the latching lever 197 out of engagement with the spring pressed pawl 198, allowing said pawl to connect the cam disc member 200 to the constantly rotating shaft 66, thereby causing said cam 200 to rotate in a counterclockwise direction (as viewed in Fig. 33) to rock the spring held bell crank 201 which, in turn, through a pin-in-slot connection, rocks another bell crank 202, which rocks a bell crank 203, somewhat similar in shape and operation to the usual type bar. The crank 203 instead of carrying type has its end twisted in the manner shown in Fig. 33 and has a slot cut in said end, through which the arm 202 slides to actuate the special date printing member 204 pivoted by a special pivot affixed to the upper end of the type bar sector. The type in this key is removable and is changed from day to day.

As the rod 196 travels rearwardly forcing the latch lever 197 from the step of pawl 198, its rearmost end is also lifted by the action of its cam-like end on a rigid rod, to clear the upper extremity of latch lever 197, thereby allowing said lever 197 to snap back to its normal position, under tension of its spring, where it will again disengage the pawl 198 when said pawl completes its cycle. The roll of bell crank 201, which rides on the cam 200, rests in an indentation in the periphery of said cam when said cam is at normal, preventing erratic action of the clutching mechanism.

Attached to the lower arm of bell crank 201 is a reciprocating horn 205 which, when said bell crank 201 is rocked, contacts the universal bar to trip the space mechanism and ribbon feed.

A more complete disclosure of this construction is given in the application for patent of— Hart, S. N. 583,285, filed December 26, 1931; Walsoe, S. N. 462,300, filed June 19, 1930.

Control bar

Mounted at the rear of the paper platen 17 is a hexagonal control bar 219 (Fig. 33) to initiate various operations of the machine such as: space, skip, carriage return, trip, back space, trip-hold, etc. The circuit for controlling these operations is shown in Fig. 38. The construction of a control bar is shown in Fig. 33. It consists of a hexagonal bar 220 mounted in brackets carried by the typewriter carriage 84. The contacts controlled thereby consist of the usual stacks of flat electrical contact springs arranged with insulating blocks between them.

The back space contact may initiate a double space operation to indicate a mistake on the tape as will be described later.

The above mentioned operations are merely examples and may be replaced by any desired operation such as that of the date printer.

Front feed

The front feed used in this machine is similar to the one disclosed in the Hart application for patent, S. N. 636,867, filed October 8, 1932, and is shown diagrammatically in Figs. 2 and 33. When the front feed operating lever 220 is rocked the bell crank 221 is rocked through a pair of gear sectors (not shown). A guide roller is mounted to the upper end of said bell crank 221. (There may be a multiplicity of these units depending upon the length of the carriage.) The lower end of the bell crank 221 is pivoted to a link 222 to the other end of which is pivoted a reciprocating link 223 to one end of which is mounted a pressure roller 224 to hold the paper tightly against the platen. The path of travel of the reciprocating link 223 is obvious in Figs. 2 and 33. In Fig. 33 both the open and closed positions of the front feed are diagrammatically shown. The link 223 is locked in operating position by the snapping past center of the lower pivot of the bell crank 221. Excessive movement of the bell crank 221 is prevented by its contact with the turned over stop 225 (Fig. 2).

The operation of the lever 226, which carries the aligning wire is obvious and is fully described in the above cited Hart application, S. N. 636,867.

Five hole combination code

As has been stated, one of the objects of this invention is to provide a mechanism for perforating a tape adapted to be run through an interpreter which will interpret the tape and cause card punching machines to perforate standard accounting system cards in accordance with the interpretation. A suitable device for making the conversion of the tape into cards is shown and described in my copending application, S. N. 737,348, filed July 24, 1934.

Although the tape produced as hereinafter described may be run through the interpreter, it may also be used to govern the transmission of impulses corresponding to the perforated tape over a telegraph or other communication channel, and to produce a duplicate tape at a distance, through the agency of a telegraph re-perforator or equivalent device. Due to this feature a five unit or five hole code is chosen; thus standard telegraph transmitters and re-perforators may be used. Examples of such are shown in patents: Kleinschmidt, 1,460,357, June 26, 1923; Creed, 1,452,793, Apr. 4, 1923; Kleinschmidt, 1,045,855, Dec. 3, 1912; Rothermel, 1,842,122, Jan. 19, 1932; Creed, 1,792,283, Feb. 10, 1931; Rosendahl, 1,481,153, Jan. 15, 1924; Benjamin, 1,298,440, Mar. 25, 1919; Bille, 1,076,944, Oct. 28, 1913; Creed, 1,804,496, May 12, 1931.

Standard five hole code provides for 32 code combinations (including the blank); while to provide for all the possible perforations of a Powers accounting system card having 45 column alphabetic and numeric; upper and lower and 90 column numeric and alphabetic punching, many more combinations would be required. However, if certain ones of these code combinations are used to represent a number of characters (as holes 3 and 5 representing L, 12, and 0) then all can be taken care of easily. This system is followed in the present instance, and arrangements made for punching the same tape combination for different characters which are ultimately to appear in different card fields. Figs. 36 and 37 show two representative code systems and the combinations assigned to the characters in each system. Manifestly, any one of a multiplicity of code interpretations may be used.

The assignment of code combinations is such that the representation for each letter of the alphabet (and each numeral) (Fig. 36) corresponds to the representation of that letter or numeral in a standard 5 hole upper and lower 90 column code as given on the following table. This correspondence demands that the pairs XII and IV; XI, and V; etc. be considered identical, except as to position (see Fig. 39). While not described further here, the value of such correspondence is pointed out in detail in my copending application, filed June 8, 1933, S. N. 674,820.

Five hole combination code

| Code | | Alpha-betic | Interpretation | | |
|---|---|---|---|---|---|
| Upper | Lower | | 45 column | 90-column upper | 90-column lower |
| 11—1—2 or 0—1—2 | 5—7—8 6—7—8 | M | | | |
| 11—2 | 5—8 | N | | | |
| 11—1—3 | 5—7—9 | Q | | | |
| 11—3 | 5—9 | P | | | |
| 0—1—3 | 6—7—9 | R | | | |
| 0—3 | 6—9 | S T | | | |
| 11—0—3 | 5—6—9 | U or V | | | |
| 11—0—2 | 5—6—8 | W | | | |
| 11—0—1 | 5—6—7 | X or Y | | | |
| 11—2—3 | 5—8—9 | | | | |
| 1—2—3 | 7—8—9 | | | 2 | |
| 0—1—2—3 | 6—7—8—9 | | | 4 | |
| 11—0—2—3 | 5—6—8—9 | | | 6 | |
| 11—0—1—2 | 5—6—7—8 | | | 8 | |
| 0—2—3 | 6—8—9 | | | | 2 |
| 11—1—2—3 | 5—7—8—9 | | | | 4 |
| 11—0—1—3 | 5—6—7—9 | | | | 6 |
| 11—0—1—2—3 | 5—6—7—8—9 | | | | 8 |
| 11—1 | 5—7 | L | 12 | 0 | |
| 0—2 | 6—8 | A | 11 | 1 | |
| 11—0 | 5—6 | B | 0 | 3 | |
| 1—2 | 7—8 | C | 1 | 5 | |
| 11 | 5 | D | 2 | 7 | |
| 1 | 7 | E | 3 | 9 | |
| 0 | 6 | F | 4 | | 0 |
| 0—1 | 6—7 | G | 5 | | 1 |
| 3 | 9 | H | 6 | | 3 |
| 2 | 8 | I | 7 | | 5 |
| 1—3 | 7—9 | J | 8 | | 7 |
| 2—3 | 8—9 | K | 9 | | 9 |

In order that special operations may be performed the receiver is so constructed that a blank space in the tape will indicate that the following perforation is to be interpreted as one of the various special operations; such as space, carriage return, back space, etc. The appearance of the tape when a blank space is left therein is shown opposite "operations" in Fig. 36. The regular code combination for "C" when preceded by a blank is interpreted as "space", that for "D" as "skip", etc. The insertion of this blank space is accomplished by a double spacing mechanism hereinafter described.

It is intended that the code perforated in the tape 216 is translated and punched upon a regular Powers card (Fig. 39) through the facilities of the translating punch, co-pending application S. N. 737,348, cited above.

The mechanism for punching the tape in accordance with the code of Fig. 36 (or the more arbitrary code of Fig. 37) will now be described.

The lever 227 (Figs. 1, 2, and 3) is for shifting the arms 207 to their various fields (upper, 45, lower), the center position being the 45 column position, the inward position the lower 90 column position, and the outmost position the upper 90 column position. In Fig. 1 the arm 207 is shown with a resilient link and stop and represents the 9 digit. In the case of the 9 digit, the tape code is exactly the same in the 90 column lower field as it is in the 45 column numerical field; hence, the 9 arm 207 must be kept in the 45 column numerical field when the hanger carrying the numerical arms is shifted to the lower 90 column field.

Tape punch

Figure 4:
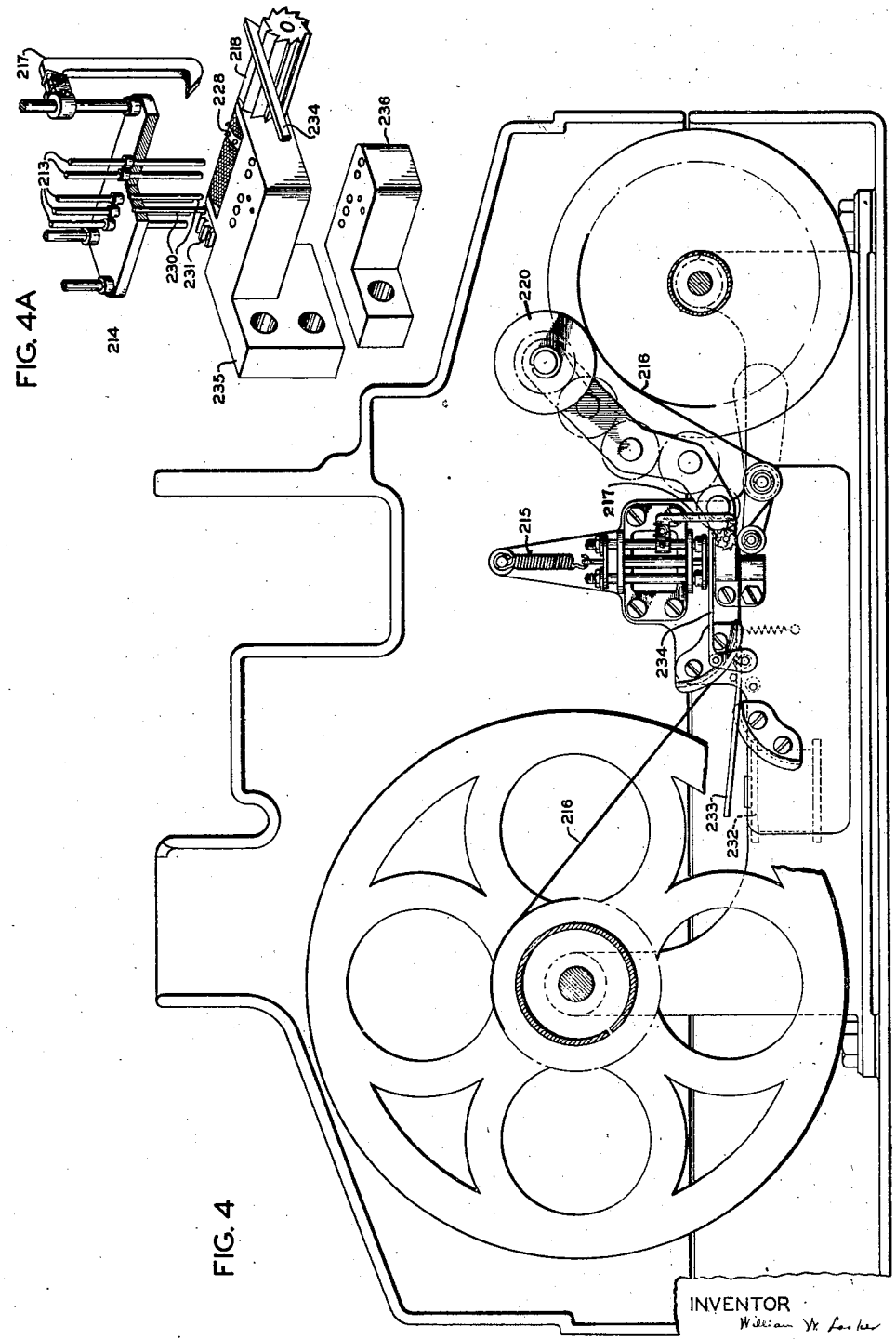
Fig. 4 is an end elevation of the punching mechanism.

The tape punching mechanism is shown in Figs. 1, 2, 3, 4, 4a, and 5. When an alphabet snatch pawl 12 is actuated, as previously described, it depresses a spring pressed interponent member 21. The lower end of said interponent 21 forces a toothed arm 207 downwardly against a row of 5 parallel bars 208 each pivoted to a pair of spring held bell cranks 210 and 211. The spacing of the teeth on the arms 207 is varied to create different combinations of punched holes in the tape. Figs. 40 and 41 are a complete illustration of the notching of the arms 207 and the code which will be perforated by the various arms in their different fields. As shown in Fig. 3, a bell crank 212 is connected by a pin and slot connection to bell crank 211 and is rocked by said bell crank 211. The other arm of bell crank 212 is bent so as to contact one of 5 punching pins 213 fitted freely in plate 214 which is rigidly connected to a similar plate and reciprocates vertically in a bracket fixed to the main frame of the punching mechanism. There is a bell crank 212 for each parallel bar 208 and a punching pin 213, for each bell crank 212. When a pin 213, or a group of said pins, is depressed, against the tension of the heavy spring 215, the plates 214 are forced downwardly by a shoulder on said pins and the pin (or pins) which has (have) been actuated by its bell crank 212, punches a hole in tape 216 (Figs. 4, 36 and 37).

An adjustable spring held hook 217 (Fig. 4) is fixed to one of the plate connecting rods. When a punch rod 213 is depressed said hook 217 snaps over one tooth of the ratchet 218 and, when the punch pins are drawn upwardly by the strong spring 215 causes said ratchet to move said tape 216 the necessary distance for a subsequent punching operation. The tape (best shown in Figs. 36 and 37) is fed by a common form of sprocket 228 (Fig. 4a) attached to the shaft of ratchet 218. The holes for said sprocket feed are punched two at a time by pins 230 fixed in the lower plate 214. The take-up mechanism, as shown in Fig. 4, comprises a train of gears driven by a pinion 231 fixed to the ratchet shaft. The actual feed is accomplished by a disc 220, which rides on the periphery of the roll of tape and may be of rubber or any other suitable material. The hold back of the magazine reel may be any one of several conventional forms.

To initiate a double spacing of the tape to indicate an operation (Fig. 36) a solenoid 232 is provided. The operation and action of this solenoid is obvious in Figs. 4 and 4a. When the solenoid 232 is energized by the action of the control bar or by any other mechanical means, the arm 233 is drawn down, causing the hook 234 to draw the ratchet 218 over one tooth, thereby moving the tape one space without punching any holes therein.

The member 235 serves as a guide for the punch pins 213 and as a bracket to carry the escapement mechanism. The member 236 is obviously the die for the punching operation.

When any of the special keys, (Fig. 42) which are similar to the alphabet keys, both in design and operation, are depressed, the cam-like surface 237 of the upstanding projection of the key lever engages the channel key locking bail, rocking said bail and thereby causing the arm 238 to close the contacts 240 thereby actuating the solenoid 232 to initiate a double space operation of the tape 216 to indicate a special operation as previously described.

A special switch 241 (Fig. 43) is provided for any special operation which might be desired on the up-stroke of the back-space key.

The switch 242 (Fig. 44) is operated by a plunger, which, in turn, is actuated by the palm tabulator 51, to initiate a double space operation on the tape for the reason previously described.

I claim:

1. In an apparatus of the character described, in combination an accounting machine including a plurality of tabulating accumulator devices, comprising individually sequentially operable key members, means operated simultaneously by said key members for printing amounts entered into said tabulating devices, automatic means for actuating said devices, a record punching device associated with said key levers including a plurality of punches, a die to co-act with said punches and mechanical means for actuating said punches comprising power driven means actuated under the control of said key levers, push rods actuated by said power driven members, shiftable members actuated thereby and parallel motion members actuatable by said shiftable members and connected to said punches.

2. In an apparatus of the character described, in combination an accounting machine, including a plurality of item selecting keys, power driven means for completing desired operation, which has been initiated by the depression of any of the item selecting keys, and means for operating a record tape punching device, associated with said accounting machine comprising a plurality of push rods operable from said power driven means, a similar plurality of shiftable interponent members adapted to be depressed by said push rods, a manually operable means for side-wise shifting of said interponent members, a plurality of parallel motion members cooperating with said shiftable members, a plurality of punches respectively operated by said parallel motion members, and a punch tape feeding means operable simultaneously with said punches.

3. In apparatus of the class described, the combination of a power operated typewriter mechanism comprising key lever members, a snatch roll, type bar members and cooperating means therebetween, a plurality of tabulating accumulator members controlled from certain of said key members adapted for addition and subtraction according to double entry bookkeeping practice, and a tape punch mechanism cooperating therewith comprising a pan member positioned underneath said typewriter, push rod members therein cooperating with said snatch roll, a plurality of shiftable code bar members actuated by said push rods, a frame member and knob for the manual shifting thereof, a plurality of parallel motion members adapted to cooperate with said code bars, a plurality of punches actuatable in response to movements of said parallel motion members and supply and take-up reels for a paper tape, and feed hole punching and feeding means cooperating therewith.

4. In a machine of the class described, the combination of a typewriter bookkeeping machine including a plurality of accumulator devices respectively adapted to serve as column footers and cross footers, key levers, type bars, a snatch roll and cooperating mechanism for the printing and accumulation of digital amounts in said accumulators according to the operation of said keys, means for perforating the said digits in a perforated code record, manually settable means for selecting between several codes for the perforating, means for clearing certain of said accumulators for the production of a clear balance, and means for causing the production of a special record punching in accordance with the clearing of said accumulators.

5. In apparatus of the class described, a set of cross bar members, a set of notched code depressor members cooperating therewith, a group of depressor members cooperating with said code members, a power driven means for actuating said depressor members and key members for initiating the depression of said depressor members and code members, and punch members actuated by said cross bars.

6. In apparatus of the class described, a set of five parallel motion cross bars, a punch and die system and lever members cooperating between said bars and said punches, a plurality of depressor members cooperating with said bars for the actuation of said punches according to the five unit code, and means including keys, a power driven snatch roll and catches for depressing said code members.

7. In apparatus of the class described, a set of five parallel motion cross bars, a punch and die system and lever members cooperating between said bars and said punches, a plurality of depressor members cooperating with said bars for the actuation of said punches according to the five unit code, certain of said code depressors representing alphabetic characters, others of said depressors representing numerical digits, means comprising a frame and control mechanism for shifting certain of said depressors to change the code produced thereby, and means including keys, a power driven snatch roll and catches for depressing said code members.

8. In apparatus of the class described, a typewriter frame and a foundation pan adapted to be positioned thereunder and to be readily removable therefrom, a code punching mechanism, actuatable by normal typewriter members, included in said removable foundation pan, said punching mechanism comprising a plurality of parallel motion bars positioned transversely of said foundation pan, and a punch mechanism and tape feed and rewind rolls positioned at the side of said foundation pan cooperating with said bars according to the actuation of the said typewriter members.

WILLIAM W. LASKER.

CERTIFICATE OF CORRECTION.

Patent No. 2,059,253.    November 3, 1936.

WILLIAM W. LASKER.

It is hereby certified that error appears in the printed specification of the above numbered patent requiring correction as follows: Page 11, second column, line 56, in the third column of the table, for "X or" read X or Z; and that the said Letters Patent should be read with this correction therein that the same may conform to the record of the case in the Patent Office.

Signed and sealed this 2nd day of February, A. D. 1937.

(Seal)

Leslie Frazer
Acting Commissioner of Patents.